United States Patent
Le Taillandier de Gabory et al.

(10) Patent No.: US 9,166,697 B2
(45) Date of Patent: Oct. 20, 2015

(54) OPTICAL TRANSMITTER AND METHOD FOR CONTROLLING THE SAME

(75) Inventors: Emmanuel Le Taillandier de Gabory, Tokyo (JP); Sadao Fujita, Tokyo (JP); Kiyoshi Fukuchi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/112,119

(22) PCT Filed: Apr. 19, 2011

(86) PCT No.: PCT/JP2011/060010
§ 371 (c)(1),
(2), (4) Date: Oct. 16, 2013

(87) PCT Pub. No.: WO2012/144082
PCT Pub. Date: Oct. 26, 2012

(65) Prior Publication Data
US 2014/0029956 A1    Jan. 30, 2014

(51) Int. Cl.
*H04B 10/04* (2006.01)
*H04B 10/54* (2013.01)
*G02F 1/01* (2006.01)
*H04B 10/50* (2013.01)

(52) U.S. Cl.
CPC ............ *H04B 10/541* (2013.01); *G02F 1/0123* (2013.01); *H04B 10/50595* (2013.01)

(58) Field of Classification Search
CPC ........... H04B 10/541; H04B 10/50595; H04B 10/516; H04B 10/5561; H04B 10/5161; H04B 10/564; G02F 1/0123
USPC ......... 398/186, 183, 188, 193, 194, 195, 196, 398/197, 198, 147, 158, 159, 33, 38; 359/245, 237, 238, 248, 279
See application file for complete search history.

(56) References Cited

U.S. PATENT DOCUMENTS

| 5,900,621 | A  | * | 5/1999 | Nagakubo et al. | ............ 250/205 |
| 6,842,587 | B1 | * | 1/2005 | McGhan et al. | ............ 398/201 |
| 7,046,414 | B2 | * | 5/2006 | Ohhira | ............ 359/238 |

(Continued)

FOREIGN PATENT DOCUMENTS

| EP | 1 727 303 A2 | 11/2006 |
| EP | 1 975 693 A1 | 10/2008 |

(Continued)

OTHER PUBLICATIONS

L. Nelson et al., "Capabilities of Real-Time Digital Coherent Transceivers", European Conference on Optical Communications, Sep. 2010, Mo.1.C.5., 978-1-4244-8535-2.

(Continued)

*Primary Examiner* — Hanh Phan

(57) ABSTRACT

Since it is difficult to emit a stable and reliable modulated lightwave signal by means of IQ modulators used for QAM format, a method for controlling an optical transmitter according to an exemplary aspect of the invention includes the steps of (a) keeping an optical amplitude of a continuous wave light output from the optical transmitter constant, (b) making operating point values in optical modulation converge to predetermined values during step (a), and (c) modulating the continuous wave light with multiple amplitudes and phase levels around the operating point values converged in step (b).

10 Claims, 19 Drawing Sheets

(56) References Cited

U.S. PATENT DOCUMENTS

| | | | |
|---|---|---|---|
| 7,092,643 B2* | 8/2006 | Kajiya et al. | 398/198 |
| 8,582,981 B2* | 11/2013 | Akiyama et al. | 398/188 |
| 2002/0001115 A1* | 1/2002 | Ishida et al. | 359/180 |
| 2002/0003648 A1* | 1/2002 | Kobayashi et al. | 359/180 |
| 2006/0263098 A1* | 11/2006 | Akiyama et al. | 398/188 |
| 2007/0058988 A1* | 3/2007 | Yonenaga | 398/186 |
| 2008/0037999 A1* | 2/2008 | Masuda et al. | 398/186 |
| 2008/0080872 A1* | 4/2008 | Tanaka et al. | 398/186 |
| 2008/0187324 A1* | 8/2008 | Akiyama et al. | 398/188 |
| 2008/0219678 A1* | 9/2008 | Doi | 398/198 |
| 2008/0239448 A1* | 10/2008 | Tanaka et al. | 359/245 |
| 2009/0060528 A1* | 3/2009 | Takashima et al. | 398/186 |
| 2009/0232517 A1* | 9/2009 | Farina et al. | 398/183 |
| 2010/0054757 A1* | 3/2010 | Smith et al. | 398/198 |
| 2010/0080571 A1* | 4/2010 | Akiyama et al. | 398/184 |
| 2010/0254715 A1* | 10/2010 | Yamashita et al. | 398/188 |
| 2011/0026935 A1* | 2/2011 | Akiyama et al. | 398/184 |
| 2011/0032594 A1* | 2/2011 | Tanaka et al. | 359/245 |
| 2011/0102258 A1* | 5/2011 | Underbrink et al. | 342/357.47 |
| 2011/0164300 A1* | 7/2011 | Shen | 359/238 |

FOREIGN PATENT DOCUMENTS

| | | |
|---|---|---|
| EP | 2 042 913 A2 | 4/2009 |
| JP | 2004020839 A | 1/2004 |
| JP | 2007043638 A | 2/2007 |
| JP | 2007133176 A | 5/2007 |
| JP | 2012217127 A | 11/2012 |

OTHER PUBLICATIONS

P. J. Winzer et al., "Generation and 1,200-km Transmission of 448-Gb/s ETDM 56-Gbaud PDM 16-QAM using a Single I/Q Modulator", (ECOC 2010, PD2.2).

Seiji Okamoto et al., "512 QAM (54 Gbit/s) Coherent Optical Transmission over 150 km with an Optical Bandwidth of 4.1 GHz", (ECOC 2010, PD2.3).

R.A. Griffin, "Integrated DQPSK Transmitters", Optical Society of America, 2005, OWE3.

International Search Report of PCT Application No. PCT/JP2011/060010 mailed Feb. 17, 2012.

Japanese Office Action for JP Application No. 2013-547418 mailed on Apr. 21, 2015 with English Translation.

* cited by examiner

FIG.11

| 1011 • | 1001 • | 0001 • | 0011 • |
| 1010 • | 1000 • | 0000 • | 0010 • |
| 1110 • | 1100 • | 0100 • | 0110 • |
| 1111 • | 1101 • | 0101 • | 0111 • |

OPTICAL TRANSMITTER AND METHOD FOR CONTROLLING THE SAME

This application is a National Stage Entry of PCT/JP2011/060010 filed Apr. 19, 2011, the contents of all of which are incorporated herein by reference, in their entirety.

TECHNICAL FIELD

The present invention relates generally to optical communications technologies, in particular, to an optical communication technology which utilizes multi-level modulation schemes.

BACKGROUND ART

One way to cope with the increasing demand for transmission of information on optical fiber links and to optimize the investment in optical fiber links is to use more efficiently the bandwidth available in one link in order to increase its capacity. A Wavelength Division Multiplexing (WDM) technology enables to increase the number of transmitted channels by adding more transmitters and receivers using different wavelengths. However, the characteristics in WDM system are limited by the bandwidth of the amplifiers inside the link and the wavelength dependency on active or passive components inside the link. Therefore, the practical usage of WDM system is limited to the S band (Short band), C band (Conventional band), or L band (Long band) in the optical spectrum.

Another way to increase the capacity of a link is to increase the Spectral Efficiency (SE) by using more efficient modulation formats for the transmitted information. This can be used in conjunction with WDM. Optical communication systems with transmission rates up to 10 Gb/s mainly utilizes On Off Keying (OOK) for modulation, where the information is coded on two amplitude levels of the lightwave signal. Besides, higher capacity systems utilize the modulation scheme based on Quadrature Phase Shift Keying (QPSK), which codes the information on four phase levels. Therefore, two binary bits can be coded per transmitted symbol. This is illustrated in the non patent literature 1 (NPL1). In this manner, the necessary bandwidth of the optical spectrum required to transmit information is used even more efficiently.

The other way to increase even more the spectral efficiency in a channel, and therefore the link capacity, is to use Quadrature Amplitude Modulation (QAM), where symbols are coded on phase and amplitude levels, and are organized as a combination of multi-level amplitudes in quadrature phase. An example of QAM system is disclosed in the non patent literature 2 (NPL2). In NPL2, the modulation format is 16QAM, where the information is coded into 16 levels, that is, 4 binary bits per symbol. This enables to increase the spectral efficiency as compared to QPSK. Furthermore, in the non patent literature 3 (NPL3), the use of 512QAM is disclosed, where the information is coded into 512 levels, that is, 9 binary bits per symbol, and the spectral efficiency increases even more as compared to 16QAM. Therefore QAM format is an efficient way to increase link capacity.

As illustrated by NPL2 and NPL3, there is a trade off between the achievable Spectral Efficiency (SE) and the achievable transmission distance. Therefore, depending on the distance on the fiber link with signal being transmitted, it is advantageous to be able to select the index of QAM format, i.e. the number of modulated symbols on the constellation or in other words power-of-two of the number of binary bits coded on one symbol, to optimize this trade-off. The use of a transmitter, which can emit light modulated at different QAM index depending on its setting, is an economically effective way to optimize this trade off.

QAM format can be performed with an optical IQ modulator, sometimes called Cartesian modulator, vector modulator, Dual Parallel modulator or nested modulator depending on the sources. In an IQ modulator, the electric signals drive two independent Mach-Zehnder devices, which can be called children Mach-Zehnder Modulators (MZM). The children MZM modulate the phase and amplitude of the same optical carrier wave. The phase in one of their outputs is relatively delayed by 90 degrees before being recombined. The phase delay between the outputs of the children MZM can be called an angle of quadrature and is ideally 90 degrees, modulo 180 degrees. These IQ modulators are used in NPL2 and NPL3 for QAM format and also used in NPL1 for QPSK modulation. These IQ modulators offer an efficient and proven way to perform QAM format.

However, it is known that there is a drift of DC (Direct Current) bias in IQ modulator due to variation of the temperature or ageing of the device. There are three types of affected biases, that is, the DC biases of each of the two children MZM and DC bias used to set the angle at quadrature. This is already known about QPSK modulation and also known about QAM format if it uses a modulator having the same structure. Drifts in biases result in incorrectly setting the modulator, which causes a degradation of the transmitted signal, and therefore a degradation of the received signal quality or in worst cases the impossibility to decode the received signal. This trouble is likely to be revealed in the characterization tests of the modulator at the production stage or at the assembly stage of the transmitter in which it is used, and at each time the modulator is first used for modulation of data, that is, at each start-up or reset operation. The same trouble is also likely to occur during the operation of the modulator. These troubles are solved for OOK, Phase Shift Keying (PSK) modulation and QPSK by using Auto Bias Control (ABC) circuits, which controls the biases of the modulators and to compensate for the DC bias change. In this manner, ABC technology can manage the drift of DC bias both at start-up or reset, and during operation.

The non patent literature 4 (NPL4) discloses a scheme which can be used for ABC to control the 90 degree phase between the outputs of the Mach-Zehnder devices. It is based on minimizing the RF power spectrum of the modulated signal. The underlying principle is that the interferences between I and Q data components enhance the RF power spectrum, and therefore that the angle of quadrature can be controlled by minimizing the RF power spectrum. This scheme in conjunction with known methods used to control the DC biases of children MZM enables to control the DC biases of an IQ modulator for QPSK modulation.

In the patent literature 1 (PTL1), the same principle as that of NPL4 is used and moreover, a dither frequency is added to control the angle of quadrature by controlling monitored spectral components relative to the dither frequency. In addition, it also explicates ABC circuits based on dithering for the control of the DC bias of the Mach-Zehnder devices. In the same way as for NPL4, such a method is effective for QPSK. It enables to compensate for the bias changes during operation and before the start-up of the modulator for QPSK.

CITATION LIST

Patent Literature

PTL1: Japanese Patent Application Laid-Open Publication No. 2008-249848

Non Patent Literature

NPL1: L. Nelson et al., "Capabilities of Real-Time Digital Coherent Transceivers", European Conference on Optical Communications (paper Mo1C5, 2010).

NPL2: P. Winzer et al., "Generation and 1,200-km Transmission of 448-Gb/s ETDM 56-Gbaud PDM 16-QAM using a Single I/Q Modulator", (ECOC 2010, PD2.2).

NPL3: S. Okamoto et al., "512 QAM (54 Gbit/s) Coherent Optical Transmission over 150 km with an Optical Bandwidth of 4.1 GHz", (ECOC 2010, PD2.3).

NPL4: R. A. Griffin et al., "Integrated DQPSK Transmitters", (OFC 2005, paper OWE3).

SUMMARY OF INVENTION

Technical Problem

One difference between QPSK and QAM formats is that QPSK is a phase modulation at constant amplitude, whereas QAM format uses multiple amplitude and phase levels. Therefore, local extrema occur in the monitor signals used to control the DC biases in such a manner as QAM format, whereas there is no local minimum for QPSK format. Nevertheless, such ABC circuits are able to compensate the DC bias changes occurring during operation with QAM format, provided that the modulator is correctly set up at the optimal conditions. However, such ABC circuit does not enable to avoid local extrema caused by QAM format at the start-up or reset and therefore does not enable to set the biases correctly and reliably.

Even where the ABC technology with dither frequency is used as shown in PTL1, it can not be avoided for the local extrema because of QAM format to occur.

As mentioned above, those related optical transmitters have a problem that it is difficult to emit a stable and reliable modulated lightwave signal by means of IQ modulators used for QAM format because drifts of DC biases in IQ modulators can not be avoided at its start-up or at its reset.

An exemplary object of the invention is to provide an optical transmitter and method for controlling the same that can emit a stable and reliable modulated lightwave signal by means of IQ modulators used for QAM format.

Solution to Problem

A method for controlling an optical transmitter according to an exemplary aspect of the invention includes the steps of (a) keeping an optical amplitude of a continuous wave light output from the optical transmitter constant, (b) making operating point values in optical modulation converge to predetermined values during step (a), and (c) modulating the continuous wave light with multiple amplitudes and phase levels around the operating point values converged in step (b).

An optical transmitter according to an exemplary aspect of the invention includes a laser emitting continuous wave light, an optical modulator modulating the continuous wave light, an auto bias control circuit controlling voltage values of direct current biases of the optical modulator, a coder coding logical binary data and outputting multi level signals, and a driver amplifying the multi level signals and driving the optical modulator thereby, wherein an optical amplitude of the continuous wave light output from the optical modulator is kept constant, the auto bias control circuit makes the voltage values converge to predetermined values, and the optical modulator modulates the continuous wave light with multiple amplitudes and phase levels around the converged voltage values.

Advantageous Effects of Invention

An exemplary advantage according to the invention provides an optical transmitter and method for controlling the same that can emit a stable and reliable modulated lightwave signal by means of IQ modulators used for QAM format.

BRIEF DESCRIPTION OF DRAWINGS

FIG. 2 is a collection of simulation results of the optical transmitter shown in FIG. 1 for QPSK format.

FIG. 3 is a collection of simulation results of the optical transmitter shown in FIG. 1 for 64QAM format.

FIG. 11 is a constellation map on one polarization of the signal emitted by the optical transmitter according to the third exemplary embodiment.

DESCRIPTION OF EMBODIMENTS

First Exemplary Embodiment

Figure 1:
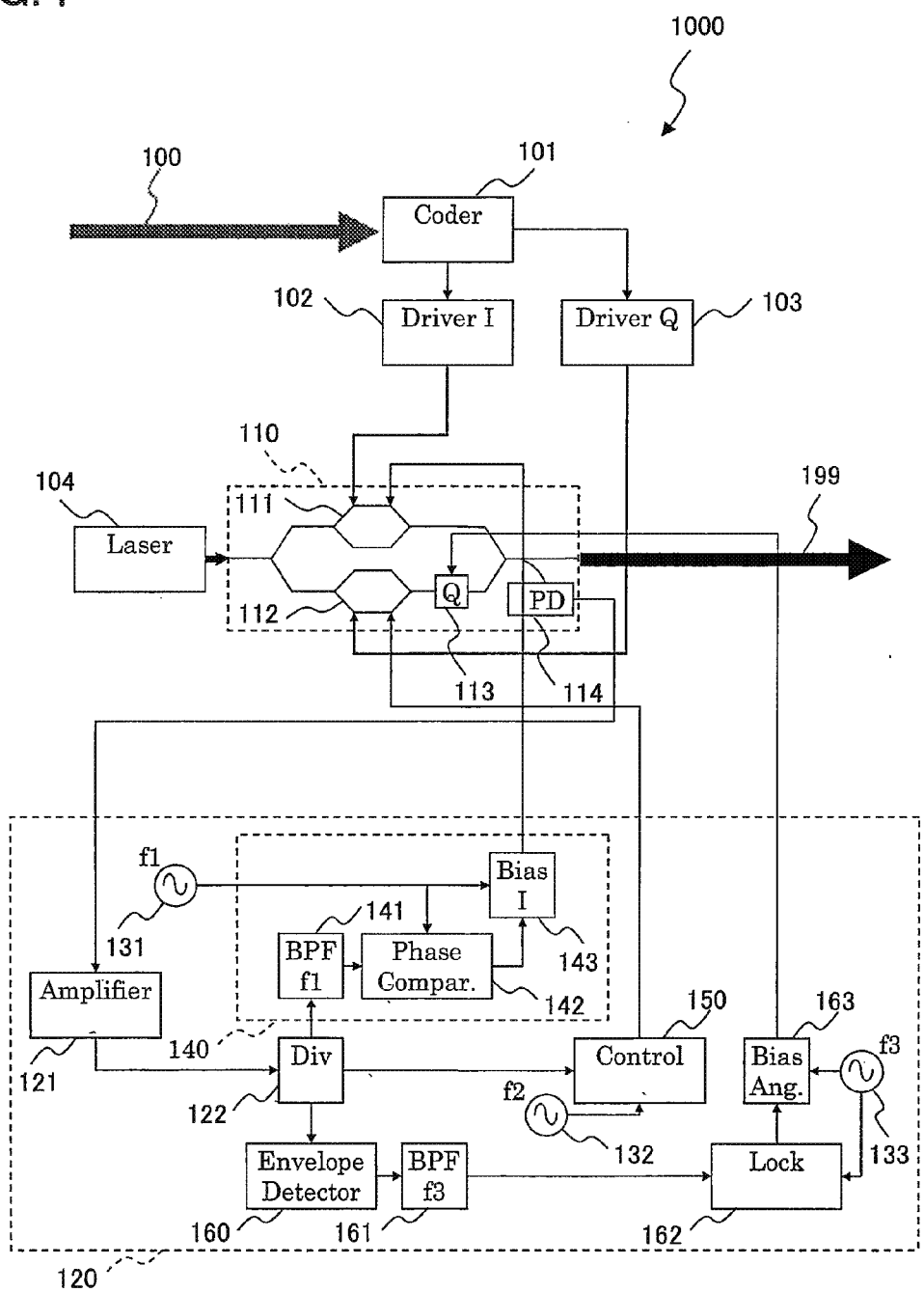
FIG. 1 is a schematic representation of an optical transmitter including an IQ modulator controlled with an ABC circuit.

FIG. 1 is a schematic representation of an optical transmitter 1000 including an IQ modulator 110 and an Auto Bias Control (ABC) circuit 120. The optical transmitter 1000 represented on FIG. 1 emits a lightwave signal 199 modulated by the IQ modulator 110 according to a logical binary data stream 100. A coder 101 generates signals for I components and Q components of the IQ modulator 110 according to the modulation format of the optical transmitter 1000 and the logical binary data stream 100. The two electrical signals generated by the coder 101 are amplified by drivers 102 and 103 so that their amplitude will be optimal for the IQ modulator 110. A laser 104 emits Continuous Wave (CW) light, which is modulated by the IQ modulator 110 according to the driving signals generated by the drivers 102 and 103.

The IQ modulator 110 includes two children Mach-Zehnder Modulators (MZM) 111 and 112 which are used for I component and Q component, respectively. The IQ modulator 110 also includes a phase shifting element 113 and an integrated monitor Photo-Detector (PD) 114. Alternatively, the monitor PD 114 can be provided independently of the IQ modulator 110 and receive a tapped portion of the output lightwave signal of the IQ modulator. The phase shifting element 113 enables to control the angle of the quadrature in the IQ modulator 110. The monitor PD 114 generates an electrical signal proportional to the intensity of the modulated light signal and can be used to monitor the conditions of the IQ modulator 110.

The ABC circuit 120 controls DC biases of the children MZM 111 and 112, as well as the bias controlling the angle of the quadrature through the phase shifting element 113, according to the monitor signal provided by the monitor PD 114. The ABC circuit 120 uses the dithers generated by oscillators 131, 132 and 133, which generate sine signals at the respective independent frequencies f1, f2 and f3, to control the biases of MZM 111, MZM 112 and the phase shifting element 113, respectively. These frequencies can be in a range from a few kilohertz to a few megahertz. The monitor signal generated by the monitor PD 114 is amplified by an amplifier 121 and is subsequently split by a divider 122 into three equal signals.

A control circuit 140 generates the DC bias for the I-child MZM 111 according to the output of the divider 122 and the sine voltage at the frequency f1 generated by the oscillator 131. A band pass filter 141 has a central frequency f1 and a bandwidth narrow enough to eliminate other frequency components at f2 and f3. The amplitude of the output of the band pass filter 141 is proportional to the frequency component at f1 of the monitor signal generated by the monitor PD 114. A phase comparator 142 generates an error signal proportional to the amplitude of the output of the band pass filter 141 and to the phase difference between the signal extracted by the band pass filter 141 around f1 and the sine signal at f1 generated by the oscillator 131. A bias circuit 143 generates a DC voltage to control the bias of the I-child MZM 111 in order to minimize the error signal generated by the phase comparator 142 and having a dither component at the frequency f1.

Another control circuit 150 is identical to the control circuit 140 and has a band pass filter with a central frequency f2. The control circuit 150 controls the DC bias of the Q-child MZM 112 according to the output of the divider 122 proportional to the monitor signal generated by the monitor PD 114, in the same manner as the control circuit 140.

The third output of the divider 122 is fed to an envelope detector 160, whose outputs are filtered by a band pass filter 161 with a central frequency f3. The output of the envelope detector 160 generates a signal reflecting RF power spectrum of the monitor signal generated by the monitor PD 114. A locking circuit 162 generates an error signal proportional to the output of the band pass filter 161 using the dither frequency f3. Finally, an angular bias circuit 163 generates a voltage minimizing the error signal generated by the locking circuit 162 and having a dither frequency f3. The voltage generated by the angular bias circuit 163 controls the angle of the quadrature of the IQ modulator 110 through the phase shifting element 113.

First, simulation results for QPSK format are explained. FIG. 2 is a collection of simulation results of the optical transmitter 1000 shown in FIG. 1 for QPSK format with a baud rate of 32 Gbaud. The bandwidth of the monitor PD 114 is 1 GHz. The frequencies f1, f2 and f3 are set for 4 MHz, 9 MHz and 7.5 MHz, respectively. The band pass filters 141, 161 and the one included in the control circuit 150 are designed accordingly. Each driving signal output by the drivers 102 and 103 has a peak-to-peak amplitude of twice Vpi. Vpi represents the difference in voltage between the maximum transmission and minimum transmission conditions of the children MZM 111 and 112 without modulating. The simulated value of Vpi is equal to 3V. This driving condition is ideal for QPSK modulation.

Figure 2A:
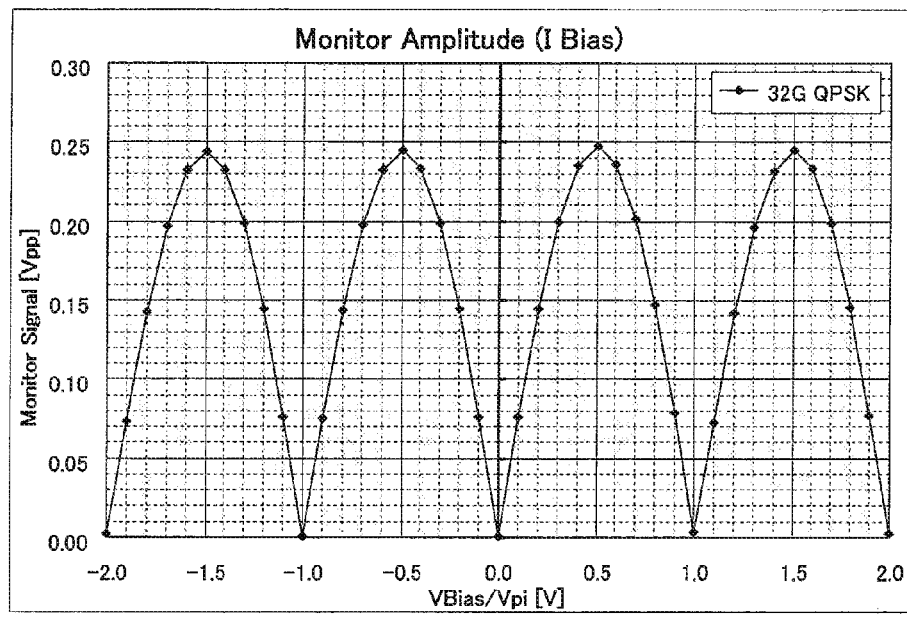
FIG. 2A is a line chart which represents the output of the band pass filter versus the DC bias.
Figure 2B:
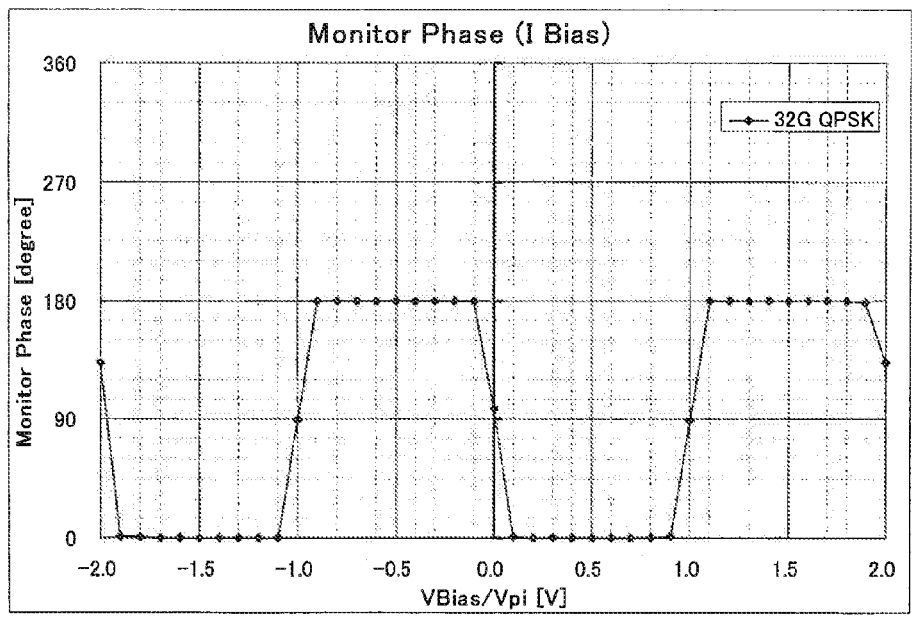
FIG. 2B is a line chart which represents the phase difference between the output of the band pass filter and the dithering sine signal.

FIG. 2A is a line chart which represents the output of the band pass filter 141 versus the DC bias of the child MZM 111 normalized by Vpi. There is a minimum at every point which represents the maximum transmission or minimum transmission characteristics of the MZM 111. FIG. 2B is a line chart which represents the phase difference between the output of the band pass filter 141 and the dithering sine signal generated by the oscillator 131. This phase alternates at every minimum point of the curve shown in FIG. 2A.

Next, an example of controlling the DC bias of the MZM 111 is explained. At the start-up or reset of the optical transmitter 1000, different conditions of the normalized bias can be considered. Depending on the temperature and status of the device, the voltage characteristics of the modulator, shown in FIG. 2A and FIG. 2B, are susceptible to be translated on their abscissa. However, for conventional reason and ease of study, we consider the characteristics as fixed and translate the voltage by the opposite amount. Therefore, in that convention and considering the periodicity of the characteristics of the modulator, the normalized voltage at start-up or reset is likely to take any of the values between 0V and 2V. When this value is between 0V and 0.5V, the nearest minimum is 0V. However, as the monitored signal and the reference sine signal are in phase, the error signal generated by the phase comparator 142 continues on strictly positive and the bias generated by the bias circuit 143 continues on growing farther from 0V.

The voltage passes through 0.5V and grows until it reaches 1V. In that case, one minimum is reachable. Furthermore, when passing over 1V, the signal and the reference sine signal will be in opposite phase, therefore, the error signal generated by the bias circuit 143 will diminish. As a result, the bias generated by the bias circuit 143 will be kept on 1V. Accordingly, 1V (bias is equal to Vpi) is a stable minimum due to the phase relation, whereas 0V is unstable. Following the same mechanism, the ABC circuit 120 generates a bias of 1V. In the same manner, when tracking variations of the voltage due to changes of temperature during operation, the generated normalized bias is kept at 1V. This means that the MZM 111 is biased at Vpi, which is the optimal bias condition for QPSK. The operation for controlling the bias of the MZM 112 is identical with that mentioned above.

Figure 2C:
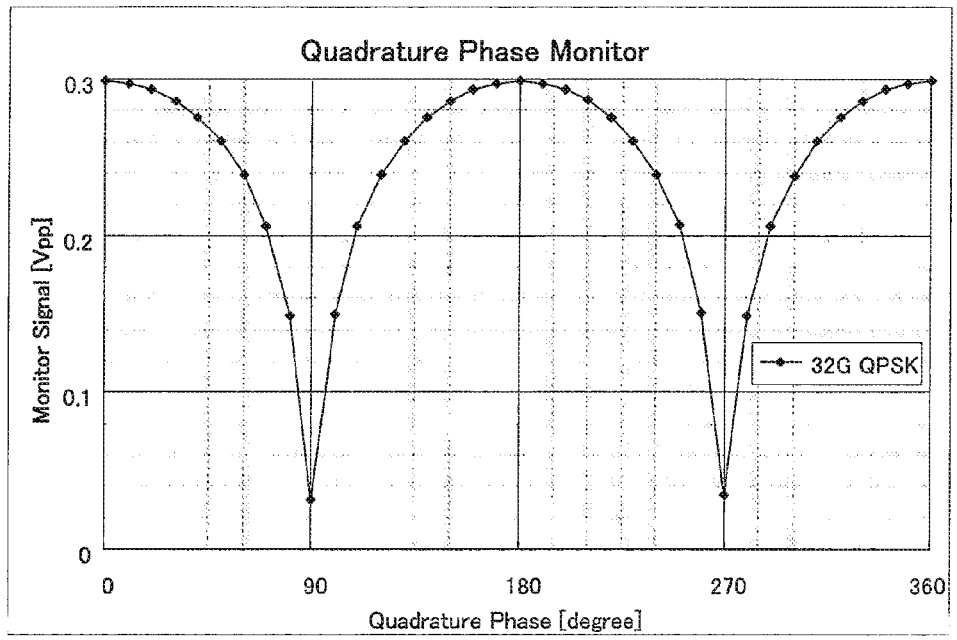
FIG. 2C is a line chart which represents the output of the band pass filter versus the angle of the quadrature.

FIG. 2C is a line chart which represents the output of the band pass filter 161 versus the angle of the quadrature which is controlled through the phase shifting element 113 from 0 to 360 degrees. The signal reaches a minimum at each point that the orthogonality of the quadrature angle is obtained, that is, the quadrature angle is 90 degrees modulo 180 degrees. This is due to the fact that the interference between the signals on I components and those on Q components is minimal in that configuration. The locking circuit 162 controls the bias generated by the angular bias circuit 163 in order to minimize the output of the band pass filter 161. In that configuration, the angle of the quadrature is optimized for QPSK modulation.

The characteristics of FIGS. 2A, 2B and 2C are identical with the three biases of the IQ modulator 110 controlled by the ABC circuit 120, whatever the conditions are. This means that the ABC circuit 120 is able to find the optimal conditions at start-up or reset for QPSK modulation. Moreover, for variations of the biases during the operation of the optical transmitter 1000 shown in FIG. 1, the ABC circuit 120 is able to compensate for these variations and to keep the biases of the IQ modulator 110 in their optimal conditions.

Figure 2D:
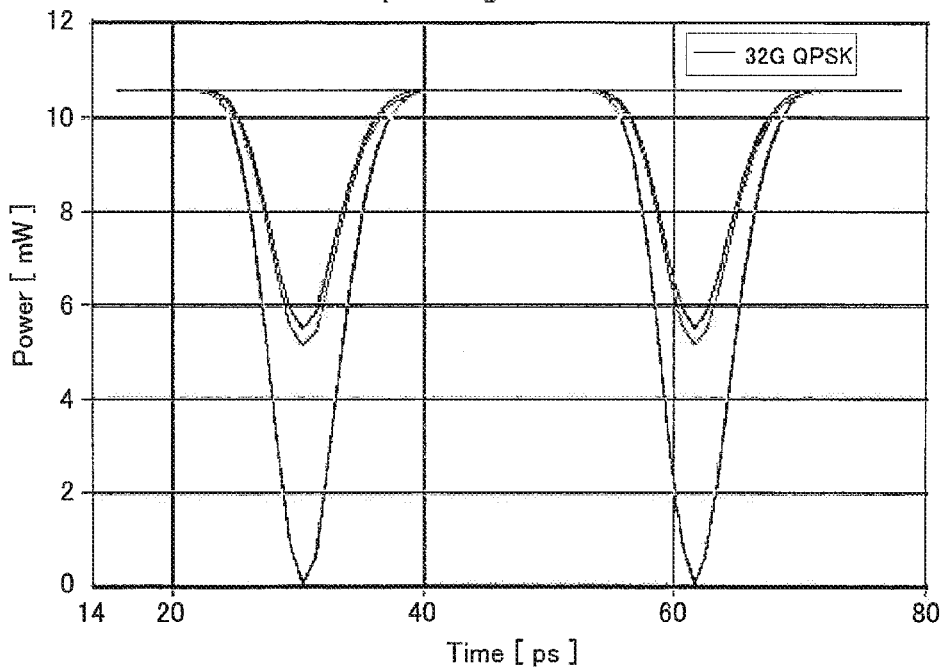
FIG. 2D is a simulated eye diagram of the QPSK lightwave signal.

FIG. 2D is a simulated eye diagram of the QPSK lightwave signal 199 generated by the optical transmitter 1000 shown in FIG. 1 on the condition that the optical transmitter 1000 emits 32 Gbaud QPSK signal with the optimal biases and the IQ modulator 110 is controlled by the ABC circuit 120.

Figure 2E:
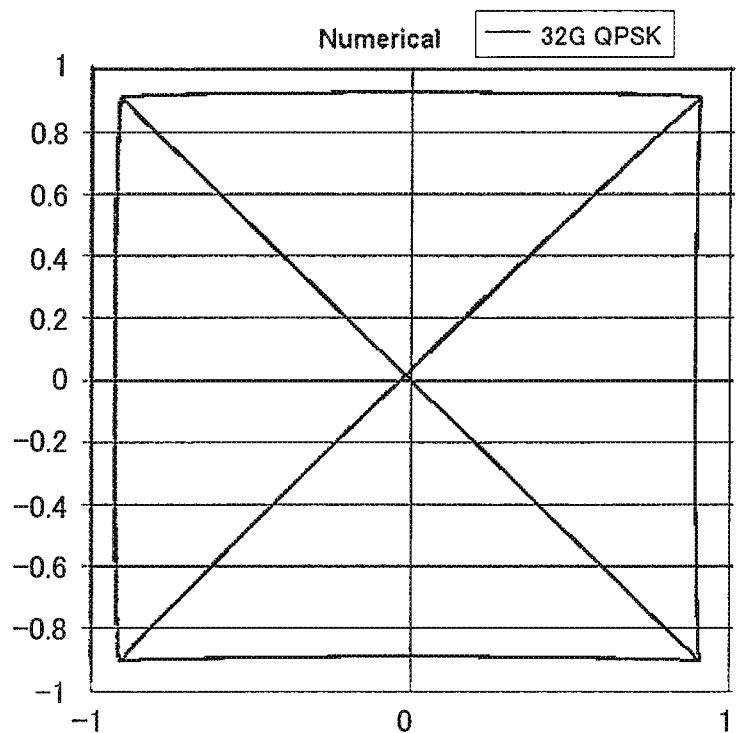
FIG. 2E is a constellation map which represents simulated trace of the lightwave signal.
Figure 2F:
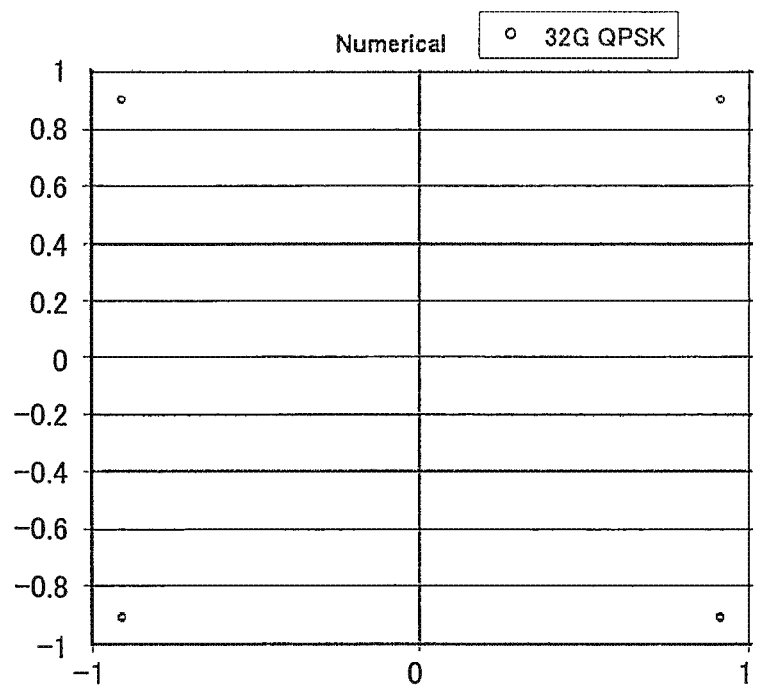
FIG. 2F is a constellation map which represents the points of the traces shown in FIG. 2E sampled at the center of the symbols.

FIG. 2E is a constellation map which represents simulated trace of the lightwave signal 199. FIG. 2F is a constellation map which represents the points of the traces shown in FIG. 2E sampled at the center of the symbols. The four possible symbols of QPSK modulation are correctly positioned and separated. The ABC circuit 120 enables to control the IQ modulator 110 at start-up or reset and during operation on the optimal conditions.

Next, simulation results for QAM format are explained as follows. FIG. 3 is a collection of simulation results of the optical transmitter 1000 shown in FIG. 1 for a modulation format chosen as 64QAM with a baud rate of 32 Gbaud. The IQ modulator 110 and dither frequencies of the ABC circuit 120 are chosen as the same as those for QPSK format represented in FIG. 2. However, the coder 101 comprises two Digital to Analog Converters (DAC). The DAC transforms the logical binary data stream 100 into electrical signals with eight levels. The multilevel electrical signals are amplified by the drivers 102 and 103, and the multilevel driving signals are fed to the IQ modulator 110 to modulate CW light according to 64QAM. The driving signals output by the drivers 102 and 103 have a peak-to-peak amplitude of twice Vpi. This driving condition is ideal for 64QAM format with proper difference between the different levels.

Figure 3A:
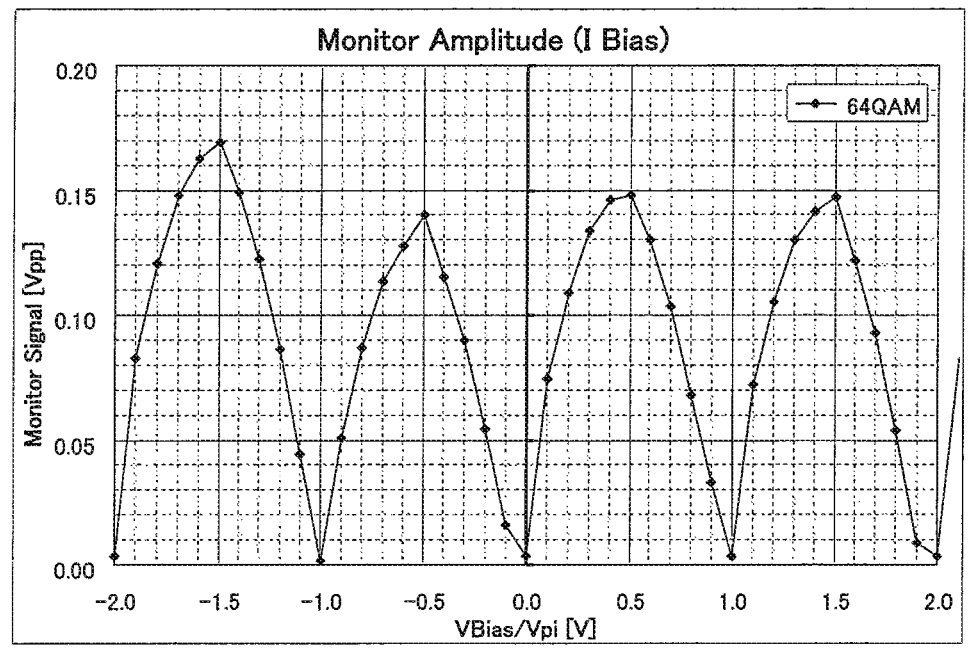
FIG. 3A is a line chart which represents the output of the band pass filter versus the DC bias.
Figure 3B:
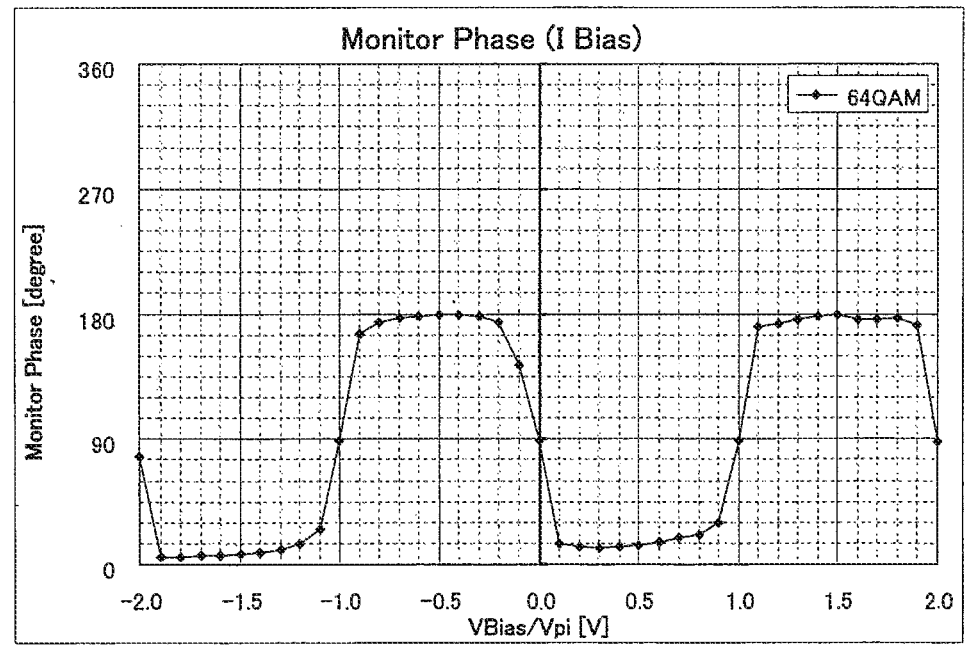
FIG. 3B is a line chart which represents the phase difference between the output of the band pass filter and the dithering sine signal.
Figure 3C:
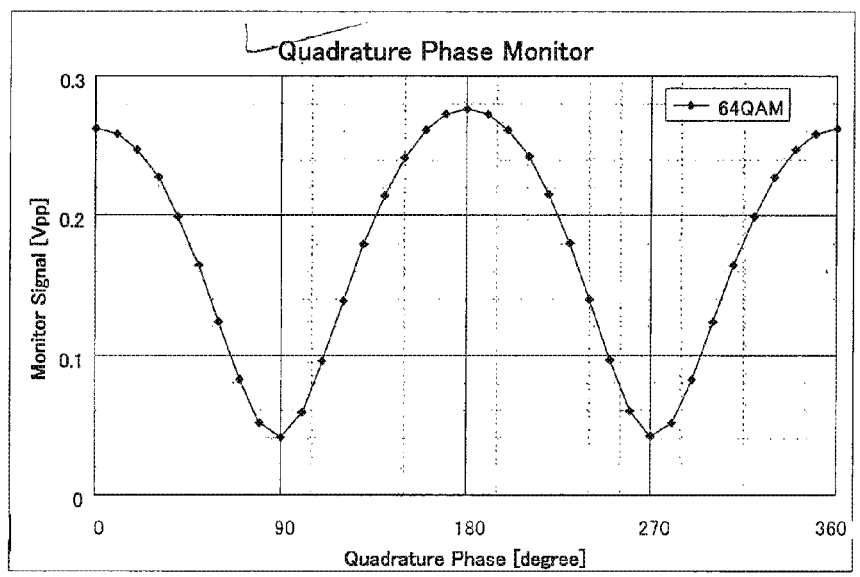
FIG. 3C is a line chart which represents the output of the band pass filter versus the angle of the quadrature.

FIG. 3A is a line chart which represents the output of the band pass filter 141 versus the DC bias of the child MZM 111 normalized by Vpi. The condition for this simulation is that the DC bias for the Q side is Vpi and a quadrature angle is 90 degrees. FIG. 3B is a line chart which represents the phase difference between the output of the band pass filter 141 and the dithering sine signal generated by the oscillator 131. FIG. 3C is a line chart which represents the output of the band pass filter 161 versus the angle of the quadrature when DC biases are set for Vpi on the I and Q children MZM. These results are identical with those shown in FIG. 2 and show that the ABC circuit 120 can control the DC bias around Vpi if a DC bias for the Q side is set for Vpi and a quadrature angle is set for 90 degrees.

Figure 3D:
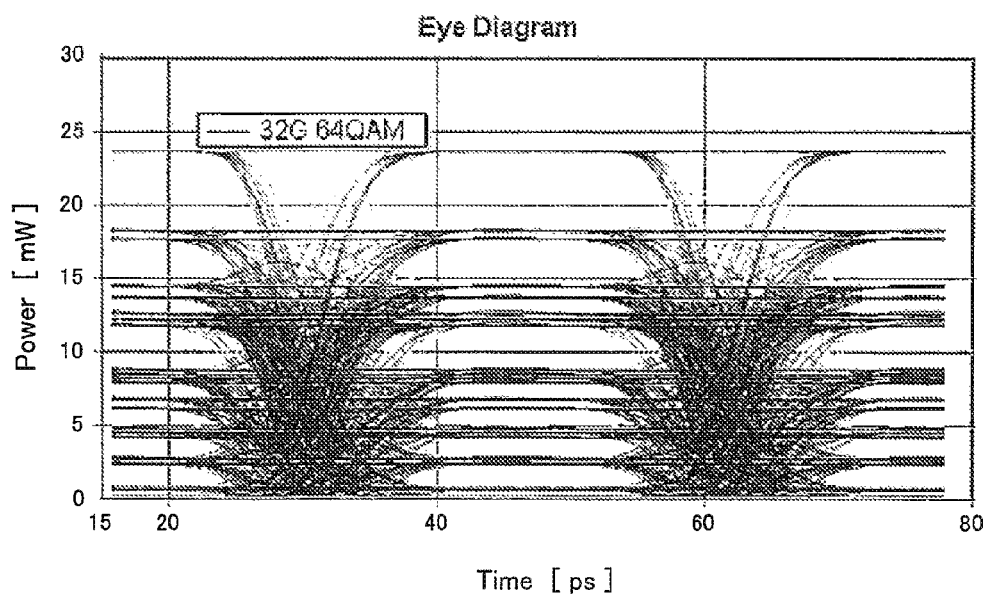
FIG. 3D is a simulated optical waveform of the 64QAM lightwave signal.
Figure 3E:
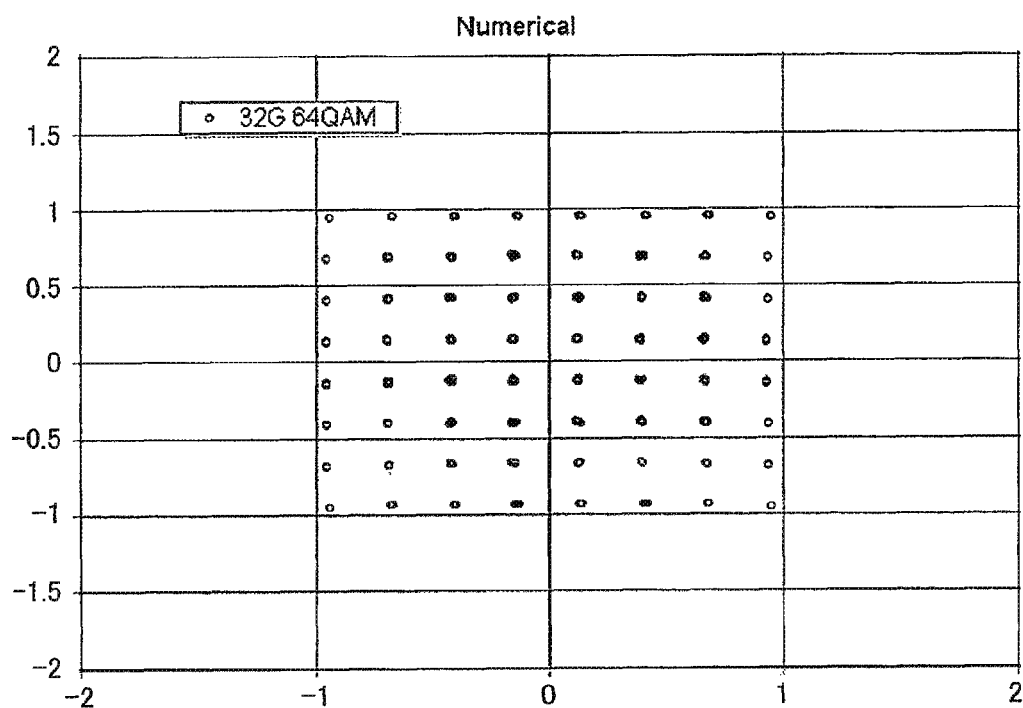
FIG. 3E is a constellation map which represents the points sampled at the center of the symbols in the lightwave signal.

FIG. 3D is a simulated optical waveform of the 64QAM lightwave signal 199 when the IQ modulator is set at the ideal conditions for the ABC circuit 120. FIG. 3E is a constellation map which represents the points sampled at the center of the symbols in the lightwave signal 199 in the same conditions. As shown in FIG. 3E, there are 64 different possible symbols, which are equally separated and located on an 8 by 8 grid. These results show that the ABC circuit 120 can control the IQ modulator 110 driving according to 64QAM format if the DC biases are close to the ideal conditions during the operation of the IQ modulator.

However, due to the fact that QAM format has no longer constant amplitude as compared with QPSK, other minima on the monitoring signals appear when the bias conditions are different from the ideal conditions. This case is likely to occur at the start-up or reset of the optical transmitter.

Figure 3F:
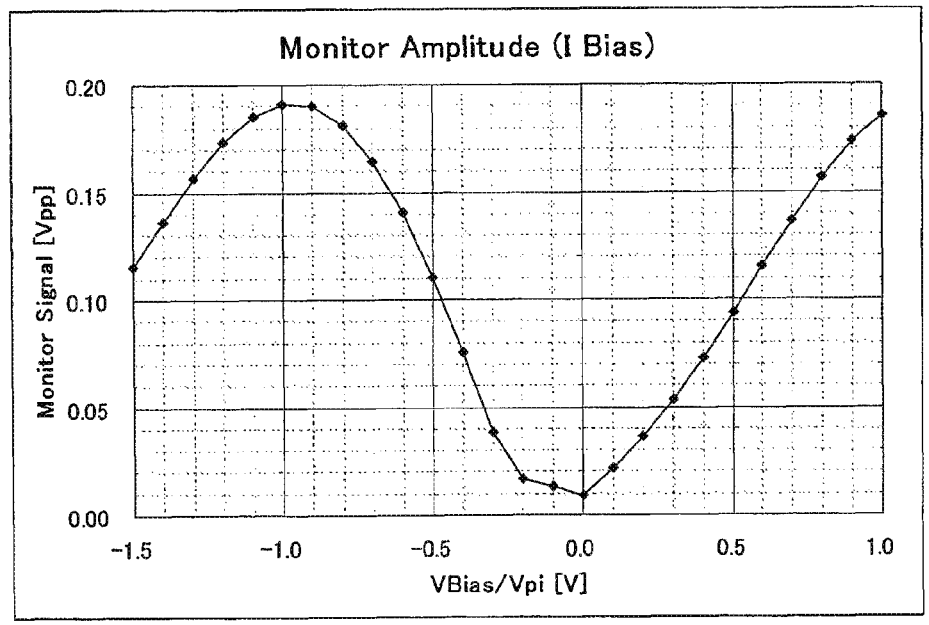
FIG. 3F is a line chart which represents the amplitude of the output of the band pass filter in the I-MZM with the bias equal to 0.
Figure 3G:
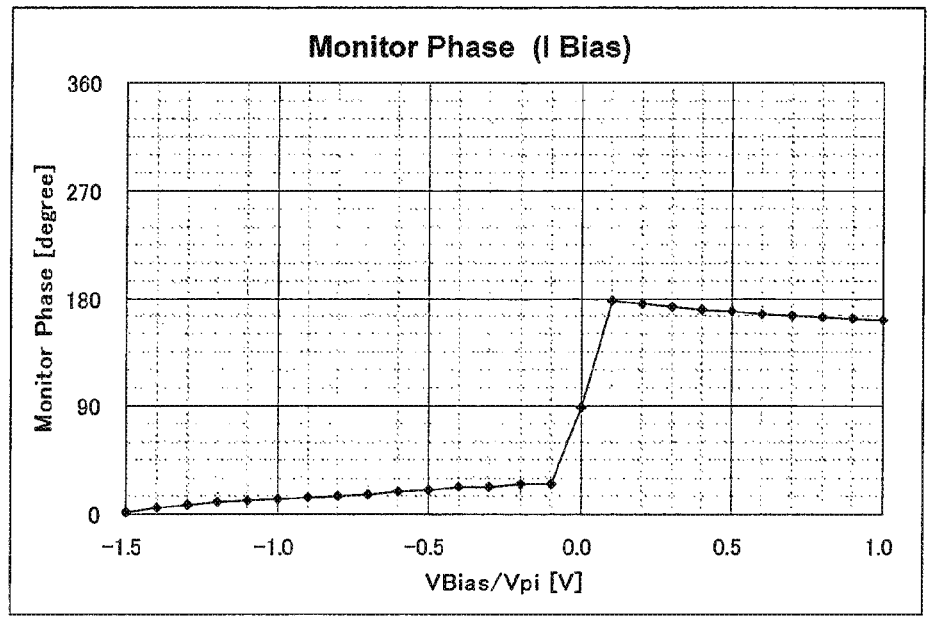
FIG. 3G is a line chart which represents the phase difference between the output of the band pass filter and the reference sine signal in the I-MZM with the bias equal to 0.

One of these conditions on which a local minimum appears is explained below. The condition is that the bias for the I-MZM is equal to 0V, the bias for the Q-MZM is equal to twice Vpi and the quadrature angle is equal to 45 degrees, and the biases are varied around these points. FIG. 3F is a line chart which represents the amplitude of the output of the band pass filter 141. FIG. 3G is a line chart which represents the phase difference between the output of the band pass filter 141 and the reference sine signal output by the oscillator 131. As shown in FIG. 3F, the amplitude of the monitor signal has a minimum at the bias condition which is equal to 0V. According to the phase variation on this point, it is a stable condition for the ABC circuit.

Figure 3H:
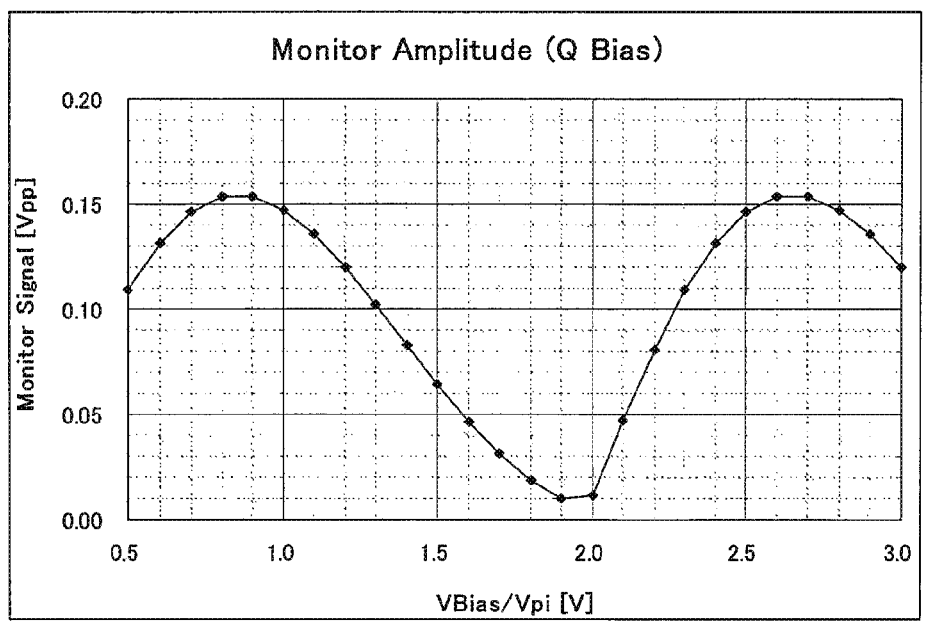
FIG. 3H is a line chart which represents the amplitude of the output of the band pass filter in the Q-MZM with the bias equal to twice Vpi.
Figure 3I:
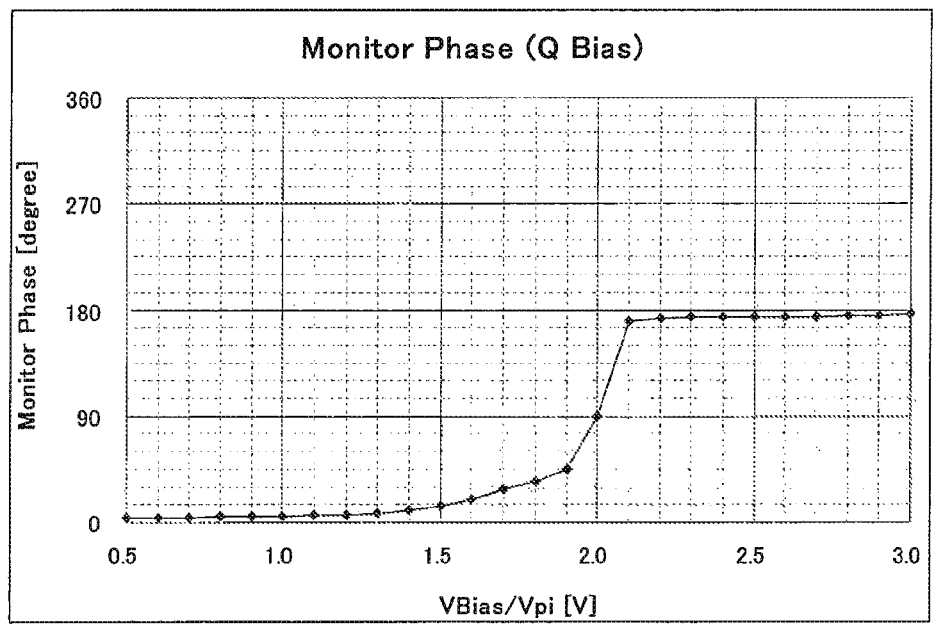
FIG. 3I is a line chart which represents the phase difference between the output of the band pass filter and the reference sine signal in the Q-MZM with the bias equal to twice Vpi.
Figure 3J:
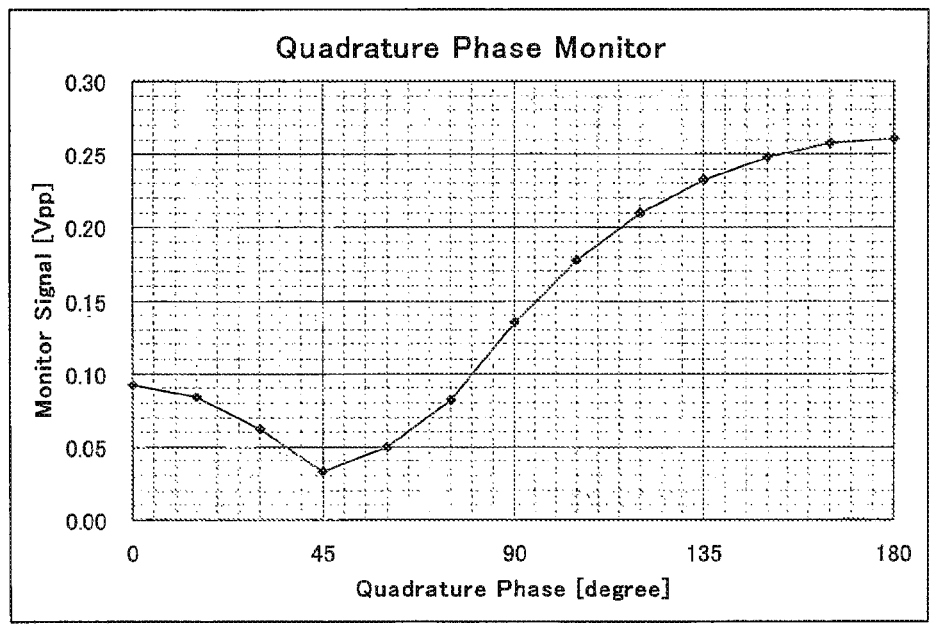
FIG. 3J is a line chart which represents the output of the band pass filter versus the angle of the quadrature.

In the same manner, FIG. 3H is a line chart which represents the amplitude of the output of the band pass filter included in another control circuit 150. FIG. 3I is a line chart which represents the phase difference between the output of the band pass filter and the reference sine signal generated by the oscillator 132. In this case, as shown in FIG. 3H, the amplitude has a minimum at the bias condition which is equal to twice Vpi. The phase change on this point shows that it is a stable condition for the ABC circuit. Finally, FIG. 3J is a line chart which represents the output of the band pass filter 161 versus the angle of the quadrature. In this case, the angle of 45 degrees is a stable condition because it is a minimum of the characteristics. Therefore, due to QAM format, a local minimum of the monitoring signal has appeared on the conditions that the bias for the I-MZM is equal to 0V, the bias for the Q-MZM is equal to 2 Vpi and the angle of the quadrature is equal to 45 degrees.

Figure 3K:
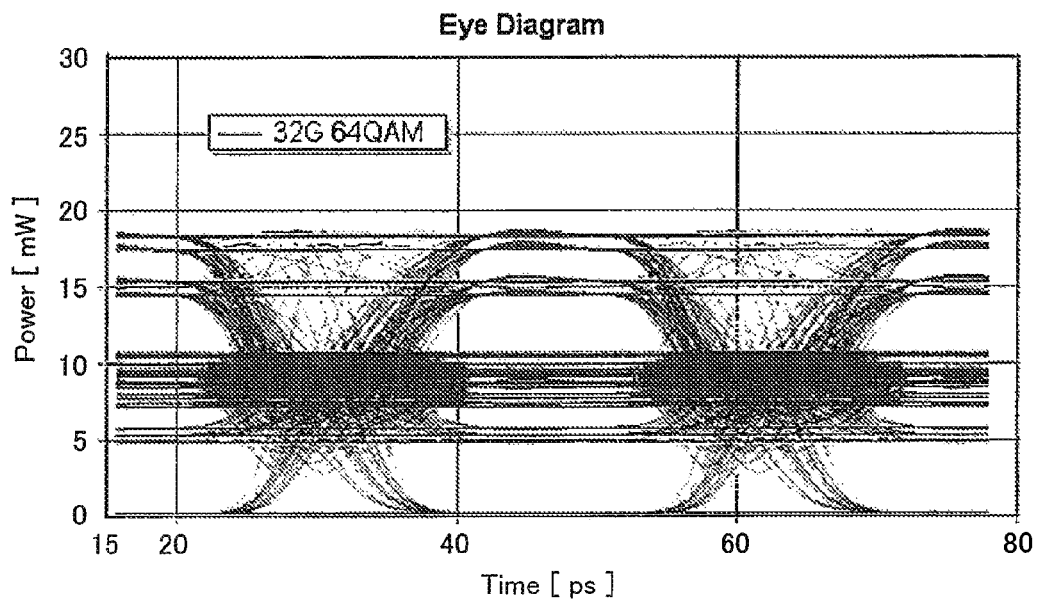
FIG. 3K is a simulated optical waveform of the 64QAM lightwave signal when the bias conditions are different from the ideal conditions.
Figure 3L:
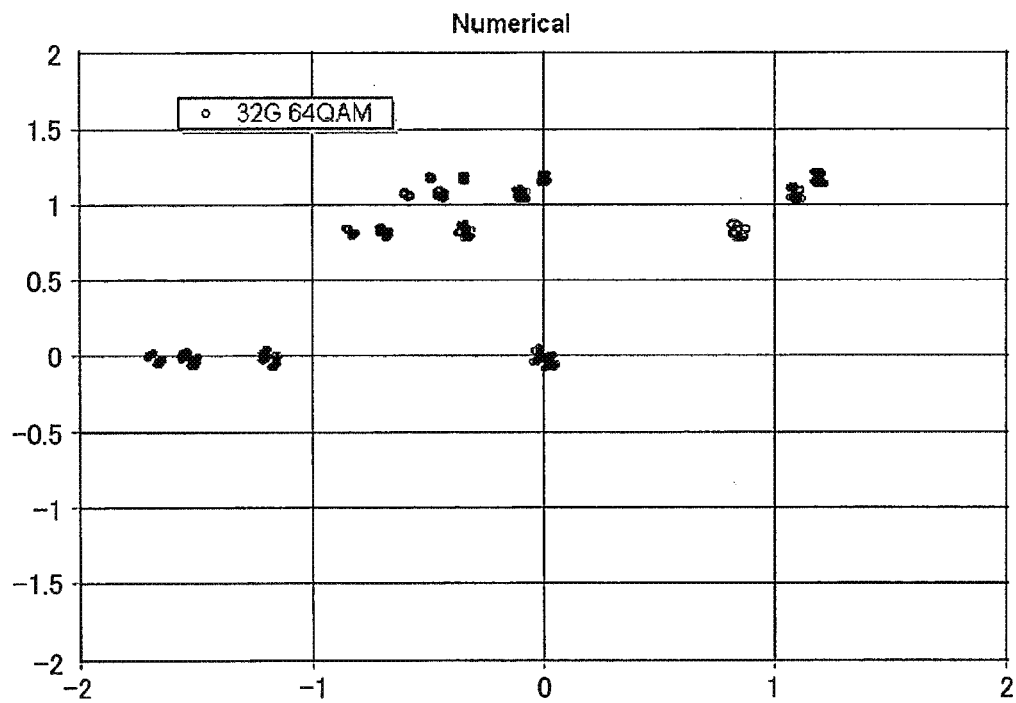
FIG. 3L is a constellation map which represents the points sampled at the center of the symbols in the 64QAM lightwave signal when the bias conditions are different from the ideal conditions.

FIG. 3K is a simulated optical waveform of the 64QAM lightwave signal 199 in these bias conditions, which are different from the ideal conditions. FIG. 3L is a constellation map which represents the points sampled at the center of the symbols in the 64QAM lightwave signal 199 in the same conditions. It is evident that the 64QAM format is not correctly performed in these conditions because some symbols are degenerated and these signals cannot be correctly demodulated. Therefore, at the start-up or reset of the optical transmitter around these biases, due to thermal conditions and modulator status, the ABC circuit will make the biases converge on this local minimum and the modulation will not be performed correctly.

Figure 3M:
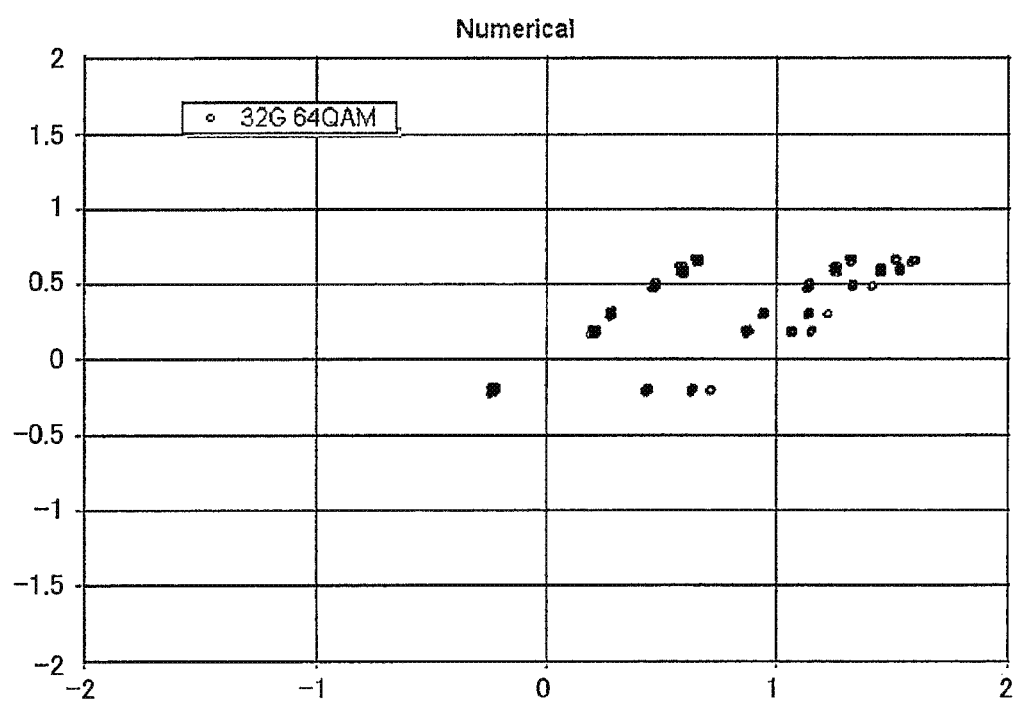
FIG. 3M is a constellation map having another local minimum in the 64QAM lightwave signal.

The presence of local minima is not limited to these conditions. FIG. 3M is a constellation map having another local minimum on the condition that the bias for the I-MZM is equal to 0.5 Vpi, the bias for the Q-MZM is equal to 0.2 Vpi and the angle of the quadrature is equal to 45 degrees. Also, the presence of these minima is not limited to 64QAM format. There are other local minima for QAM formats with different indices, including 16QAM, 32QAM, 128QAM, 256QAM, and 512QAM in which the amplitude levels are multiple.

Figure 4:
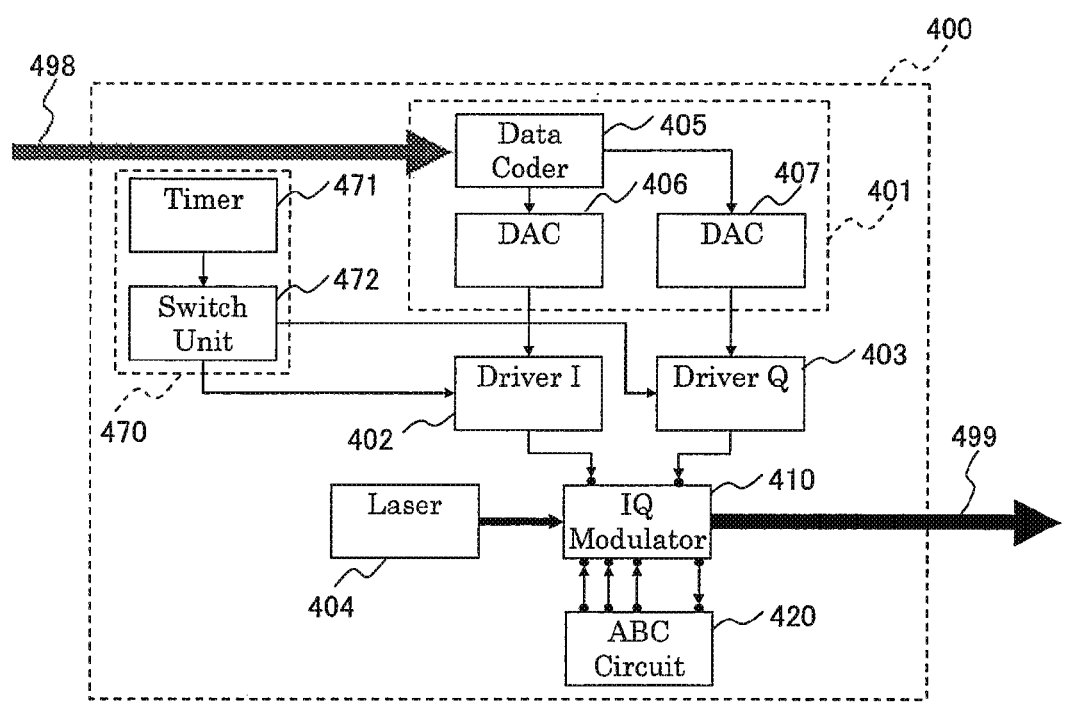
FIG. 4 is a schematic representation of an optical transmitter according to the first exemplary embodiment.

Next, an optical transmitter according to the present embodiment is explained. FIG. 4 is a schematic representation of an optical transmitter according to the present embodiment. An optical transmitter 400 emits a lightwave signal 499 modulated according to a logical binary data stream 498 at the modulation format of the transmitter. The optical transmitter 400 can be an xQAM transmitter which emits a lightwave signal 499 modulated at the xQAM format according to a logical binary data stream 498. Here, x represents the QAM index, for instance x is equal to 64 for 64QAM format. A laser 404 emits continuous wave (CW) light which is modulated by an IQ modulator 410 as an optical modulator. The IQ modulator 410 can be identical to the IQ modulator 110 shown in FIG. 1. An Auto Bias Control (ABC) circuit 420 controls three DC biases of the IQ modulator 410, that is the DC bias controlling the I child MZM, the DC bias controlling the Q child MZM and the DC bias controlling the quadrature angle, according to the output of the integrated monitor PD in the IQ modulator 410. A coder 401 comprises a data coder unit 405 and digital to analog converters (DAC) 406, 407. The data coder unit 405 splits the logical binary data stream 498 into two sub-streams which are coded to generate multi level signals for the DAC 406 and 407. The output of the DAC 406 and 407 is amplified by the respective drivers 402 and 403 to generate the electrical signals driving the respective I and Q children MZM in the IQ modulator 410.

The optical transmitter 400 includes a driver controller 470 which contains a timer 471 and a switch unit 472. The timer 471 controls the switch unit 472 according to a predetermined time Tswitch. The time Tswitch is measured from the start-up time or alternatively from the reset time of the optical transmitter 400 and is designed to keep enough time for the ABC circuit 420 to reach convergence. The switch unit 472 ensures that the drivers 402 and 403 are turned off at the start-up or reset of the optical transmitter 400. When the timer 471 has measured the time Tswitch, it activates the switch unit 472, and then the switch unit 472 turns on the drivers 402 and 403.

Figure 5:
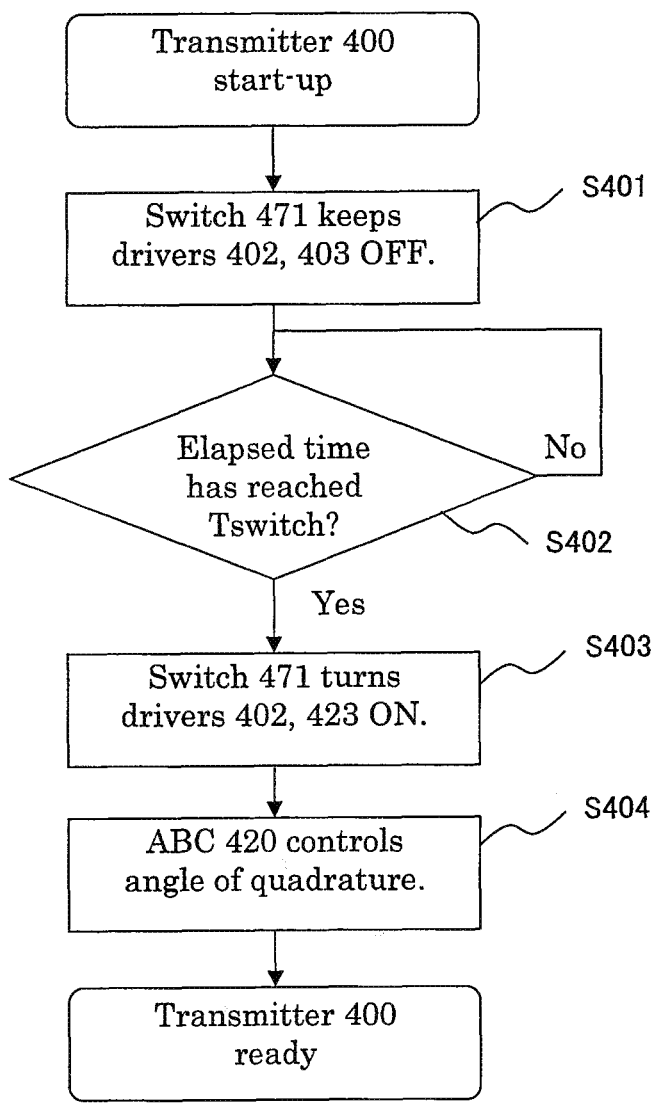
FIG. 5 is a flowchart showing a method for controlling the optical transmitter according to the first exemplary embodiment.

Next, a method for controlling the optical transmitter according to the present embodiment is explained. FIG. 5 is a flowchart showing a method for controlling the optical transmitter 400 shown in FIG. 4. Hereinafter, an example of the operation of the optical transmitter 400 will be explained referring to FIG. 5. In the present embodiment, a 132 Gb/s transmitter with 64QAM format is used as the optical transmitter 400. Therefore, it operates at 22 Gbaud. The logical binary data stream 498 is a binary data stream with an aggregated rate of 132 Gb/s. Each of the output of the data coder 405 has an aggregated rate of 66 Gb/s. The DAC 406 and 407 generate 8-level electrical signals at 22 Gbaud.

The optical transmitter 400 is first turned on at the start-up and its start-up sequences start. The switch unit 472 keeps the drivers 402 and 403 off (step S401 in FIG. 5), that is, keeps the output voltage values of the drivers constant. As a result, the optical amplitude of continuous wave light has been kept constant. At this point, the ABC circuit 420 is on, as well as the laser 404 and the IQ modulator 410. However, since the drivers 402 and 403 are kept off, their output is null. In this condition, the ABC circuit 420 controls the DC biases of the IQ modulator 410. As mentioned above, at the start-up of the IQ modulator 410, its DC biases could result in being falsely set due to local minima appearing in 64QAM format. However, since the modulation data is null, that is, constant, the ABC circuit 420 can make the DC biases of the children MZM converge to their minimum transmission point Vpi, which is voltage value of direct current bias corresponding to the optimal operating point value of the IQ modulator 410 and is also the optimal setting point for 64QAM. The optimal operating DC bias for the children I and Q MZM is equal to Vpi, modulo 2*Vpi, that is a bias where the Mach-Zehnder interferometer is set for destructive interference. The optimal operating point for bias controlling the quadrature angle between the I and Q MZM is the voltage corresponding to a phase difference of 90 degrees modulo 180 degrees.

The timer 471 measures the elapsed time from the start-up time of the optical transmitter 400, and determines whether the elapsed time has reached Tswitch (step S402). At the time Tswitch (step S402/Yes), the ABC circuit 420 has already converged the DC biases. The timer 471 signals to the switch unit 472 that it has reached Tswith. The switch unit 472 then turns the drivers 402 and 403 on (step S403). At this moment, the IQ modulator 410 starts to modulate the light according to 64QAM format. Since the DC biases of the children MZM have already reached their optimal points, the ABC circuit 420 is able to track the drift of the DC biases during the operation. Furthermore, in this condition, the ABC circuit 420 can also control the angle of the quadrature to its optimal setting of 90 degrees without encountering any local minimum (step S404). In this way, the start-up sequence of the optical transmitter 400 has finished and the DC biases of the IQ modulator 410 have correctly been set for QAM modulation. As a result, during the operation of the optical transmitter 400, the ABC circuit 420 is able to track any variation in the DC biases.

Alternatively, the sequence of FIG. 5 can be applied at the reset of the transmitter 400. In that case, the reset sequence of the optical transmitter 400 has finished and the DC biases of the IQ modulator 410 have correctly been set. As a result, during the operation of the optical transmitter 400, the ABC circuit 420 is able to track any variation in the DC biases.

In an alternative implementation of the present embodiment, the index of QAM format of the optical transmitter 400 shown in FIG. 4 can be set by setting the data coder 405 properly. For instance, 256QAM can be chosen for the modulated format at the start. In this implementation, according to the flowchart shown in FIG. 5, it becomes possible for the optical transmitter 400 to start and operate correctly, independently of the selected modulation format.

As mentioned above, according to the present embodiment, the optical transmitter can emit a stable and reliable modulated lightwave signal by means of IQ modulators used for QAM format. It is because the DC biases of the IQ modulators can converge to their minimum transmission point by using the constant or null modulation data at the start-up. In other words, it is enabled to avoid reaching local minima of the monitoring signals used for ABC circuit with QAM format. Therefore the present embodiment enables correct and reliable start-ups of the modulation. Furthermore, once the start-up sequence has been achieved, controlling by ABC circuit enables correct operation. And, it is unnecessary to use any other light that can interfere with the lightwave carrier. Finally, the present embodiment can be used for QAM format with any index as well as QPSK format.

In addition, it is possible for the optical transmitter according to the present embodiment to be implemented by means of simple off the shelf electronics, therefore it is cost effective. Additionally, the optical transmitter can be implemented with little footprint, therefore it can be made smaller.

Second Exemplary Embodiment

Figure 6:
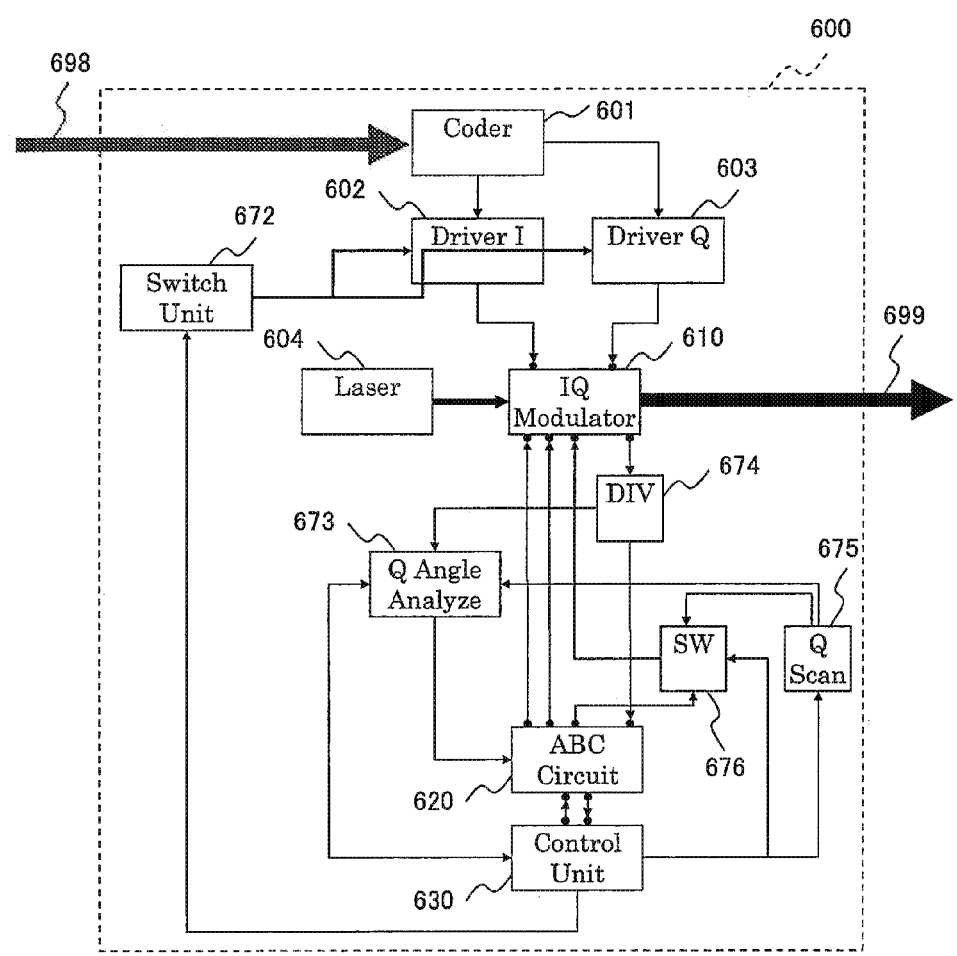
FIG. 6 is a schematic representation of an optical transmitter according to the second exemplary embodiment.

FIG. 6 is a schematic representation of an optical transmitter according to the second exemplary embodiment. An optical transmitter 600 is an xQAM transmitter which emits a lightwave signal 699 modulated at the xQAM format according to a logical binary data stream 698. Here, x represents the QAM index. A coder 601 is identical to the coder 401 shown in FIG. 4. The coder 601 includes a data coder and two DAC and generates multilevel electrical signals to drive an IQ modulator 610 after being amplified by the drivers 602 and 603. The IQ modulator 610 modulates the CW light emitted by a laser 604 according to I and Q driving signals. The drivers 602 and 603 can be switched off by a switch unit 672. The switch unit 672 commands the drivers 602 and 603 to supply voltage. The switch unit 672 is controlled by a control unit 630. The control unit 630 is made of an electrical circuit and can include a microprocessor.

The three DC biases of the IQ modulator 610 are controlled by an ABC circuit 620. The output of the monitor PD integrated in the IQ modulator 610 is split by a divider 674. One output of the divider 674 is used by the ABC circuit 620 to control the DC biases of the IQ modulator 610. Another output of the divider 674 is recorded by an angle analyzer 673 with reference to value of the DC bias set to control angle of the quadrature in the IQ modulator 610. The angle analyzer 673 is controlled by the control unit 630. In addition, the angle analyzer 673 communicates the most appropriate DC voltage for controlling the angle of the quadrature to the ABC circuit 620. If the ABC circuit 620 is similar to the ABC circuit 120 shown in FIG. 1, the appropriate information on the bias to control the angle of the quadrature is provided by the angle analyzer 673 which is similar to the angular bias circuit 163.

A scan circuit 675 generates different DC voltages and is controlled by the control unit 630. The output of the scan circuit 675 is connected to the angle analyzer 673. The angle analyzer 673 records the output of the scan circuit 675 at the same time as receiving the output of the divider 674, which is a signal split from the monitor PD in the IQ modulator 610. The output of the scan circuit 675 is also connected to a switch 676. The switch 676 can select as its output either the voltage generated by the scan circuit 675 or the DC bias generated by the ABC circuit 620 in order to control the angle of the quadrature in the IQ modulator 610. The switch 676 is also controlled by the control unit 630. The control unit 630 can also switch on or off the ABC circuit 620 and monitors the error signals generated by the ABC circuit 620 for the control of the DC biases. Here, an error signal is defined as a signal whose magnitude or phase is proportional to the difference between an actual received value and a standard value.

Figure 7:
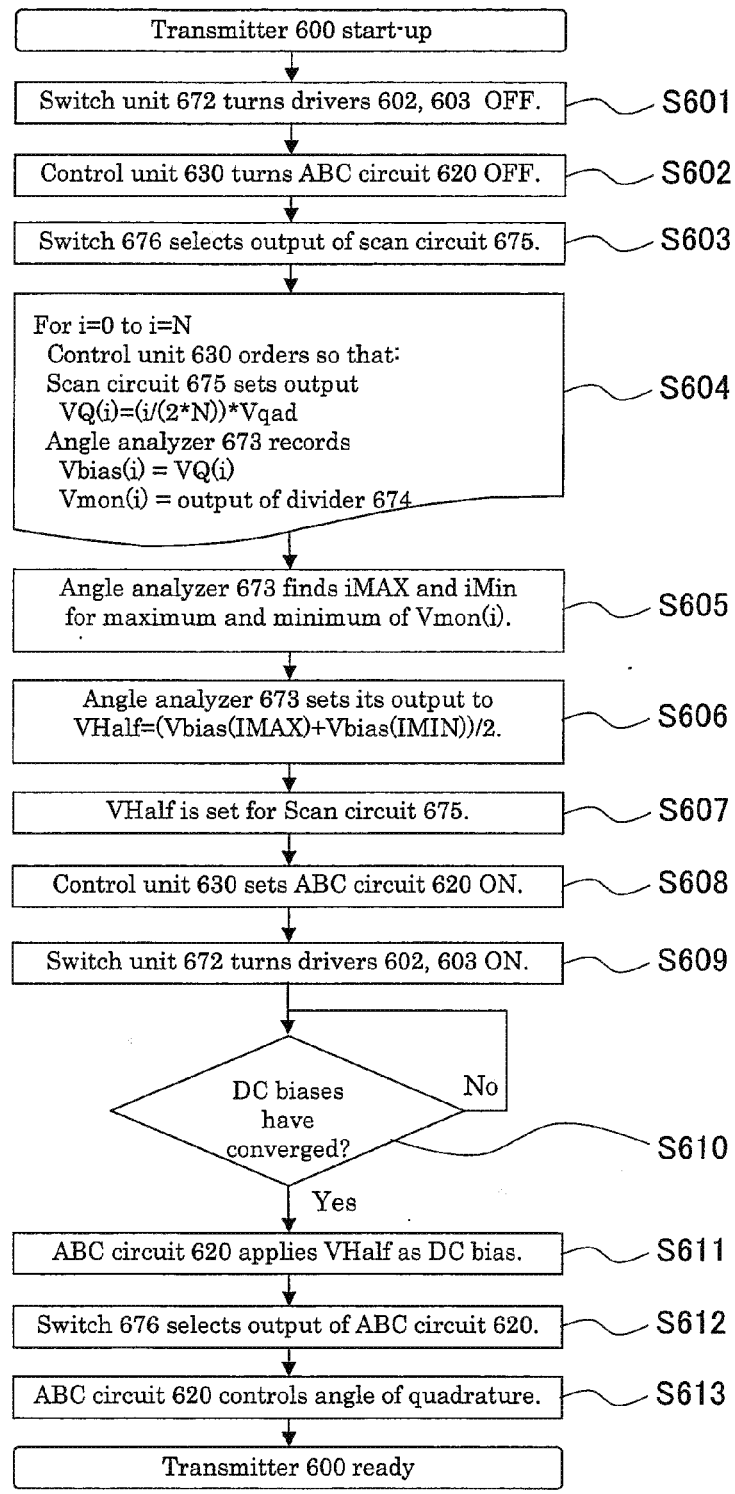
FIG. 7 is a flowchart showing a method for controlling the optical transmitter according to the second exemplary embodiment.

FIG. 7 is a flowchart showing a method for controlling the optical transmitter 600 according to the present embodiment. The sequence shown in FIG. 7 enables a correct start-up of the xQAM transmitter shown in FIG. 6. When the optical transmitter 600 is powered on or reset, the control unit 630 orders the switch unit 672 to turn off the drivers 602 and 603 by turning their power supply down (step S601 in FIG. 7). In the same manner, the control unit 630 turns the power supply of the ABC circuit 620 down (step S602). The control unit 630 sets the switch 676 for selecting the output of the scan circuit 675 (step S603).

And then, the control unit 630 orders the scan circuit 675 to take each one of N+1 voltage values VQ within a proper voltage range Vqad. The proper voltage range Vqad can be chosen so that it enables to create a 180 degree phase difference for the angle of the quadrature in the IQ modulator 610. The number of these voltage values can be in the order of 5. For each of the VQ values, the angle analyzer 673 records with low speed Analog to Digital Converters (ADC) the value VQ and the corresponding level Vmon of the monitor PD included in the IQ modulator 610. These values can be recorded on a volatile memory included in the angle analyzer 673 (step S604). Then, the control unit 630 orders the angle analyzer 673 to scan the recorded Vmon values and to search for the maximal value and minimal value (step S605). The angle analyzer 673 generates an average voltage VHalf which is the average of the voltage VQ corresponding to the maximal Vmon and the minimal Vmon (step S606). This average voltage corresponds roughly to the DC bias necessary to set the angle of the quadrature in the IQ modulator 610 around 90 degrees. It is half way from the estimation of constructive interference in the IQ modulator (0 degree quadrature) and to the destructive interference in the IQ modulator (180 degrees quadrature). The control unit 630 reads the VHalf and sets the VHalf for the scan circuit 675 (step S607).

Then, the control unit 630 sets the ABC circuit 6200N (step S608) and it orders the switch unit 672 to turn the drivers 602 and 6030N (step S609). The ABC circuit 620 controls the DC biases for the I and Q children MZM of the IQ modulator 610, whereas the angle of the quadrature in the IQ modulator 610 is kept around 90 degrees. In this configuration, the ABC circuit 620 can find the proper DC biases for the children MZM without falling in an improper local minimum due to QAM format.

The control unit 630 polls the error signals of the DC biases for the children MZM to the ABC circuit 620. If the ABC circuit 620 is similar to the ABC circuit 120 shown in FIG. 1, the polled error signals are the output of the phase comparator 142 and the corresponding signal in the control circuit 150. The control unit 630 determines whether the error signals of the DC biases have converged (step S610). When the error signals are below a threshold chosen by considering whether the DC biases have converged (step S610/Yes), the control unit 630 orders the ABC circuit 620 to apply VHalf as the DC bias controlling the angle of the quadrature of the IQ modulator 610 (step S611). If the ABC circuit 620 is similar to the ABC circuit 120 shown in FIG. 1, the output of the angular bias circuit 163 is set to VHalf. Then, the control unit 630 orders the switch 676 to select the DC bias for controlling the angle of the quadrature of the ABC circuit 620 (step S612). In that configuration, the ABC circuit 620 can effectively control the angle of the quadrature in the IQ modulator 610 and set around 90 degrees, assuring that there is no occurrence of any improper local minimum due to QAM format (step S613).

Once the start-up sequence of the optical transmitter 600 has been achieved, the DC biases of the IQ modulator 610 are correctly set. During the operation of the optical transmitter 600, the ABC circuit is able to track all biases variations.

In an alternative implementation of the present embodiment, the timing at which VHalf is applied to the ABC circuit 620 can be determined by a timer similar to the timer 471 shown in FIG. 4 instead of by polling the error signals of the ABC circuit 620.

Figure 8:
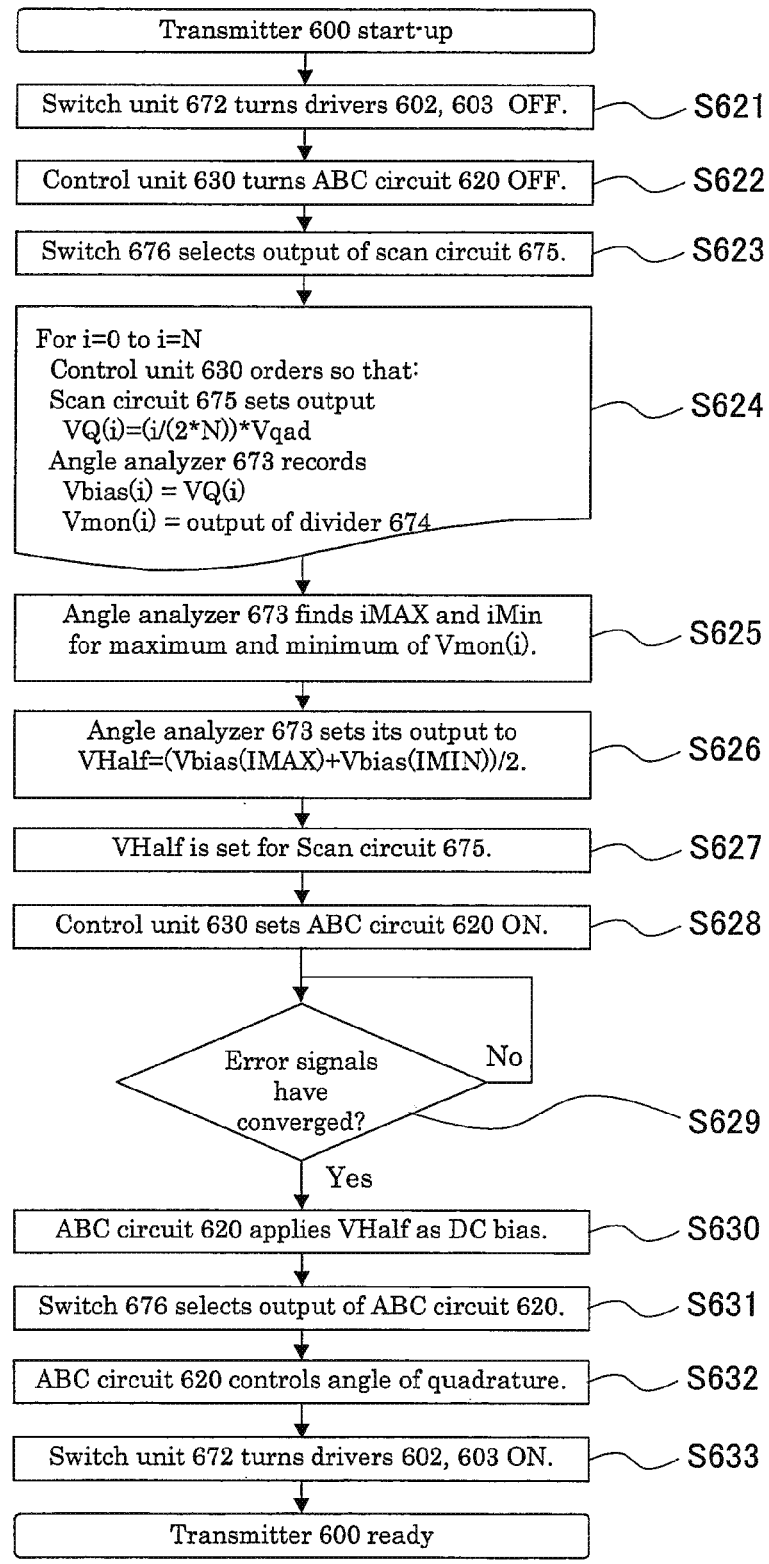
FIG. 8 is a flowchart showing another method for controlling the optical transmitter according to the second exemplary embodiment.

FIG. 8 is a flowchart showing another method for controlling the optical transmitter 600 according to the present embodiment. The sequence shown in FIG. 8 enables a correct start-up of the xQAM transmitter shown in FIG. 6. When the optical transmitter 600 is powered on or reset, the control unit 630 orders the switch unit 672 to turn off the drivers 602 and 603 (step S621 in FIG. 8). The control unit 630 turns the power supply of the ABC circuit 620 down (step S622). The control unit 630 sets the switch 676 for selecting the output of the scan circuit 675 (step S623).

And then, the control unit 630 orders the scan circuit 675 to take each one of N+1 voltage values VQ within a proper voltage range Vqad. For each of the VQ values, the angle analyzer 673 records the value VQ and the corresponding level Vmon of the monitor PD included in the IQ modulator 610. These values can be recorded on a volatile memory included in the angle analyzer 673 (step S624). Then, the control unit 630 orders the angle analyzer 673 to scan the recorded Vmon values and to search for the maximal value and minimal value (step S625). The angle analyzer 673 generates a voltage VHalf which is the average of the voltage VQ corresponding to the maximal Vmon and the minimal Vmon (step S626). This voltage corresponds roughly to the DC bias necessary to set the angle of the quadrature in the IQ modulator 610 around 90 degrees. The control unit 630 reads the VHalf and sets the VHalf for the scan circuit 675 (step S627).

Then, the control unit 630 sets the ABC circuit 6200N (step S628). The ABC circuit 620 controls the DC biases for the I and Q children MZM of the IQ modulator 610, whereas the amplitude of modulation signal is still kept constant or null because the drivers 602 and 603 are powered down. In this configuration, the ABC circuit 620 can find the proper DC biases for the children MZM without falling in an improper local minimum due to QAM format.

The control unit 630 polls the error signals of the DC biases for the children MZM to the ABC circuit 620. The control unit 630 determines whether the error signals of the DC biases have converged (step S629). When the error signals are below a threshold chosen by considering whether the DC biases have converged (step S629/Yes), the control unit 630 orders the ABC circuit 620 to apply VHalf as the DC bias controlling the angle of the quadrature of the IQ modulator 610 (step S630). Then, the control unit 630 orders the switch 676 to select the DC bias for controlling the angle of the quadrature of the ABC circuit 620 (step S631). In that configuration, the ABC circuit 620 can effectively control the angle of the quadrature in the IQ modulator 610 and set around 90 degrees, assuring that there is no occurrence of any improper local minimum due to QAM format (step S632).

And then, the control unit 630 orders the switch unit 672 to power the drivers 602 and 6030N (step S633). As a result, the IQ modulator 610 is actually modulating the lightwave carrier with xQAM format. In this case, similarly, once the start-up sequence of the optical transmitter 600 has been achieved, the DC biases of the IQ modulator 610 are correctly set. During the operation of the optical transmitter 600, the ABC circuit is able to track all biases variations.

Third Exemplary Embodiment

Figure 9:
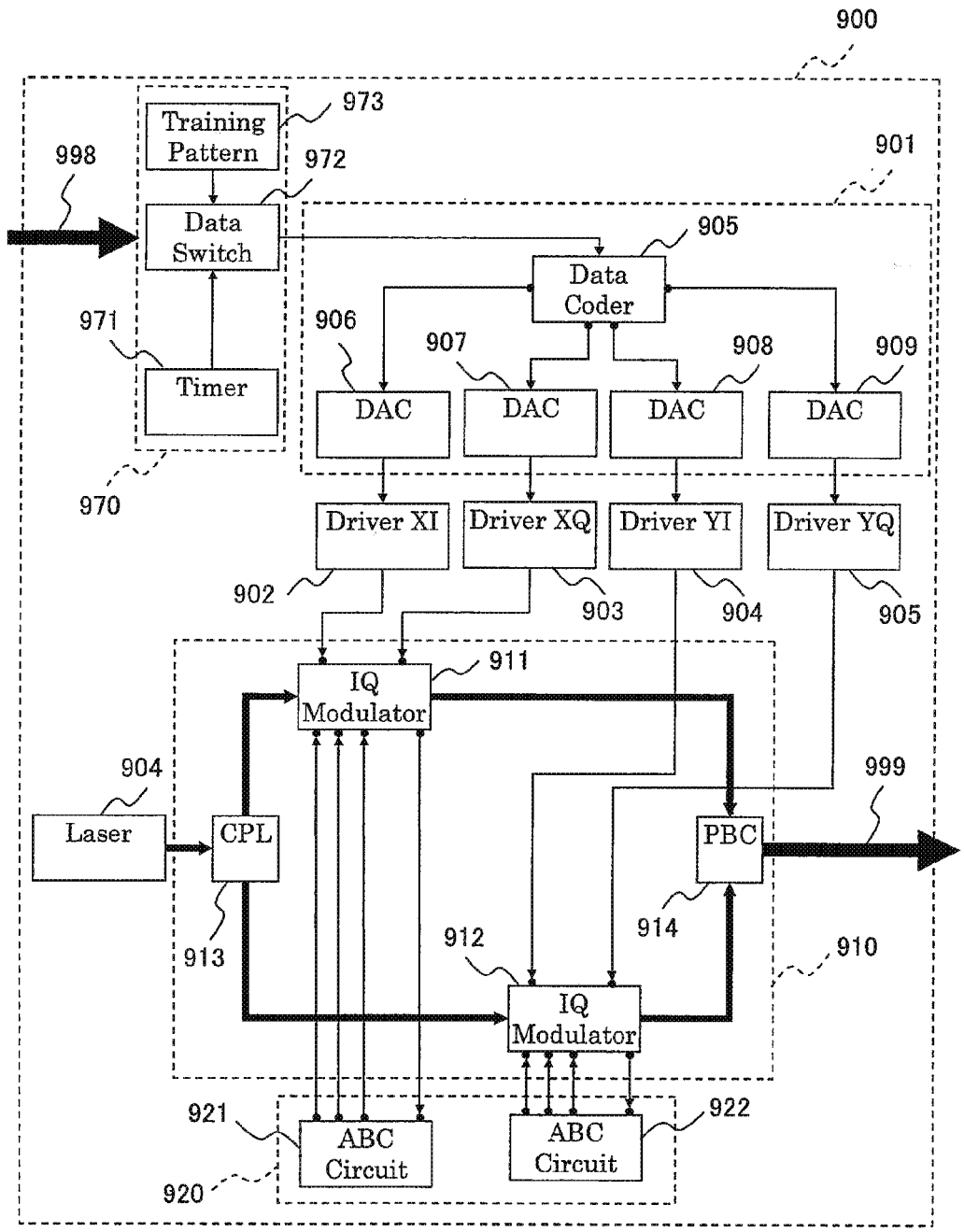
FIG. 9 is a schematic representation of an optical transmitter according to the third exemplary embodiment.

FIG. 9 is a schematic representation of an optical transmitter according to the third exemplary embodiment. An optical transmitter 900 is a Polarization Multiplexed (PM) xQAM transmitter which emits a lightwave 999 modulated at the xQAM format according to a logical binary data stream 998. Here, x represents the QAM index. The optical transmitter 900 includes a data controller 970 which contains a timer 971, a data switch 972, and a training pattern generator 973.

The logical binary data stream 998 passes through the data switch 972. The data switch 972 outputs, according to its state, either the logical binary data stream 998 or a fixed data sequence generated by the training pattern generator 973. The data switch 972 receives a command from the timer 971. The data pattern emitted by the training pattern generator 973 is chosen so that the corresponding modulated lightwave signal 999 has three or four possible states which have the phase difference of 90 degrees between their adjacent states, respectively and have the constant amplitude at the center of their symbols.

The output of the data switch 972 is encoded by a coder 901, which generates four multilevel signals to modulate it in the xQAM format. The coder 901 includes a data coder 905, which generates four streams that are transformed into multilevel signals by four DAC 906, 907, 908, and 909. The outputs of the DAC are amplified by respective drivers 902, 903, 904, and 905.

CW light is emitted by a laser 904 and is split by a polarization maintaining coupler (CPL) 913. One output of the coupler 913 is fed into an IQ modulator 911, which is similar to the IQ modulator 110 shown in FIG. 1. The other output of the coupler 913 is fed into another IQ modulator 912, which is similar to the IQ modulator 911. The outputs of the IQ modulators 911 and 912 are combined by the polarization beam combiner (PBC) 914, which rotates the polarization of one of its inputs by 90 degrees. The IQ modulator 911, 912, the coupler 913 and the polarization beam combiner 914 can be integrated into a single package as a single Dual Polarization (DP) IQ modulator 910.

The CW light is modulated on the X polarization by the IQ modulator 911 according to the driving signals generated by the drivers 902 and 903. On the Y polarization, the CW light is modulated by another IQ modulator 912 according to the driving signals generated by the drivers 904 and 905. The DC biases of the IQ modulator 911 are controlled by an ABC circuit 921 and the DC biases of another IQ modulator 912 are controlled by an ABC circuit 922. These ABC circuits 921 and 922 can be integrated as a single ABC circuit 920, which controls the DC biases of the IQ modulator 910.

Figure 10:
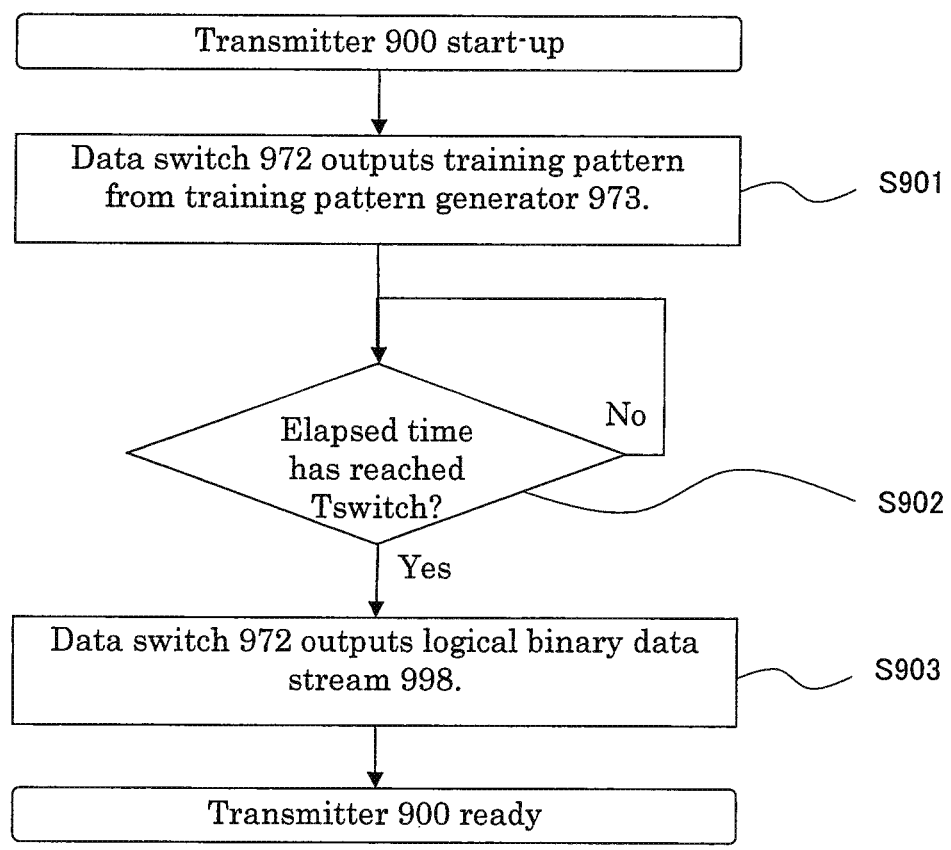
FIG. 10 is a flowchart showing a method for controlling the optical transmitter according to the third exemplary embodiment.

FIG. 10 is a flowchart showing a method for controlling the optical transmitter 900 according to the present embodiment. The sequence of the flowchart shown in FIG. 10 enables a correct start-up of the PM-xQAM transmitter 900 in FIG. 9. When the optical transmitter 900 is powered on or reset, the data switch 972 is set to output the training pattern emitted by the training pattern generator 973 (step S901 in FIG. 10). The timer 971 is similar to the timer 471 shown in FIG. 4. The timer 971 measures the elapsed time from the start-up time of the optical transmitter 900, and determines whether the elapsed time has reached Tswitch (step S902), where Tswitch is designed so that the ABC circuit 920 has reached a stable state before Tswitch. After a time Tswitch (step S902/Yes), the data switch 972 switches its output and outputs the logical binary data stream 998 (step S903). According to the properties of the training pattern emitted by the training pattern generator 973, the ABC circuit 920 is able to control correctly all the DC biases of the DP-IQ modulator 911, 912 at start-up on the condition that the training pattern ensures that the local minima due to xQAM format do not arise. At the time, the optical transmitter 900 emits xQAM data and the DC biases of its IQ modulator have been set for correct values at start-up. Furthermore, the ABC circuit is able to track the variation in the DC biases occurring during operation.

FIG. 11 is a constellation map on one polarization of the signal emitted by the optical transmitter 900 shown in FIG. 9. The modulation format is 16QAM. There are 16 possible states which are equidistant and distributed on a four-by-four grid. On top of each symbol, the corresponding 4 bits sequence represents one case of Gray coding. When the coder 901 generates multilevel signals according to this coding, the emitted light symbol on one constellation obeys the constellation shown in FIG. 11. In this case, the training pattern generated by the training pattern generator 973 can be designed by selecting only the symbols which are equidistant from the origin. That is, the symbols, for example, correspond to the sequences of "1011" (A), "0011" (B), "1111" (C) and "0111" (D). Any combination of at least three of these four symbols can be used. For instance, a repetition of a binary PRBS (Pseudo Random Bit Stream) 11 pattern can be used, in which the sequence "00" is coded as (A), "01" as (B), "11" as (C) and "10" as (D).

The index of QAM format of the optical transmitter 900 can be changed. In this case, the training pattern generator 973 holds sets of training patterns for each settable index of QAM format and emits the corresponding training pattern. In addition, the optical transmitter 900 is able to emit the lightwave modulated at the QPSK format. Therefore, the optical transmitter 900 is correctly set for its DC biases at start-up for any of the modulation formats that is able to be applied. Furthermore, the operation of the optical transmitter 900 is made optimal in spite of bias drifts occurring during its operation.

During the operation of the optical transmitter, the ABC circuit is able to essentially track the drift of DC biases once the DC biases have reached their optimal points. However, in an alternate example, the ageing of the modulator has caused one of the DC bias to drift to a value closed to the physical limit of the voltage that the ABC circuit can generate. Although the ABC circuit is able to compensate for the drift within range of the bias it can generate a DC bias, it may be advantageous, in order to make the life time of the transmitter longer, to reset the transmitter so that the ABC circuit converges to the lowest DC bias corresponding to the optimal operation value of the IQ modulator. In this case, the presence of local minima caused by QAM modulation prevents the DC biases from converging to the optimal DC biases values after reset.

To solve this technical problem, it is favorable to change the output voltage values of the drivers to a fixed value while the transmitter is operating and keeps the output voltage values constant. As an example, the solutions described as the first, second and third embodiments above are applicable while the transmitter is operating. After the DC biases converge to the optimal points, the drivers start a normal operation. That is, the drivers start to amplify the electrical signals generated by the coder and apply the amplified electrical signals to the children MZM.

According to this example, the DC biases of the IQ modulators are able to converge to the optimal operation point again, after reset of the ABC circuit during the transmitter operation.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

This invention can be applied to an optical communication system which utilizes multi-level modulation schemes.

REFERENCE SIGNS LIST

400, 600, 900 optical transmitter
401, 601, 901 coder
402, 403, 602, 603, 902, 903, 904, 905 driver
404, 604, 904 laser
410, 610, 911, 912 IQ modulator
420, 620, 920 ABC circuit
470 driver controller
630 control unit
970 data controller

The invention claimed is:

1. A method for controlling an optical transmitter, comprising the steps of:
   (a) keeping an optical amplitude of a continuous wave light during optical modulation constant;
   (b) making operating point values in the optical modulation converge to predetermined values during step (a); and
   (c) modulating the continuous wave light with multiple amplitudes and phase levels around the operating point values converged in step (b).

2. The method for controlling an optical transmitter according to claim 1, wherein,
   in step (a), output voltage values of drivers for optical modulation are kept constant;
   in step (b), voltage values of direct current biases corresponding to the operating point values of an optical modulator are converged to predetermined voltage values; and
   in step (c), the continuous wave light is modulated around the converged voltage values of direct current biases of the optical modulator.

3. The method for controlling an optical transmitter according to claim 2, wherein,
   in step (a), the driver is kept off and outputs null voltage value for a predetermined time;
   in step (b), the voltage values of direct current biases are converged to minimum transmission points of the optical modulator by means of auto bias control method within the predetermined time; and
   in step (c), the driver is turned on and the optical modulator modulates the continuous wave light according to a quadrature amplitude modulation format.

4. The method for controlling an optical transmitter according to claim 1, wherein,
   in step (a), output voltage values of drivers for optical modulation are kept constant;
   in step (b), error signals of direct current biases corresponding to the operating point values of an optical modulator are converged by means of auto bias control method; and
   in step (c), the continuous wave light is modulated around the direct current biases of the optical modulator determined in step (b).

5. The method for controlling an optical transmitter according to claim 1, further comprising:
   searching direct current biases corresponding to a maximal value and to a minimal value of output from an optical modulator; and
   applying an average voltage of the direct current biases as a direct current bias controlling an angle of quadrature in optical modulation.

6. The method for controlling an optical transmitter according to claim 1, wherein,
   in step (a), the continuous wave light is modulated by using a fixed data sequence which is chosen so that
   lightwave signals modulated according to the data sequence have a constant amplitude at the center of modulated symbols, and at least two consecutive symbols of lightwave signals modulated according to the data sequence have a phase difference of 90 degrees.

7. An optical transmitter, comprising:
a laser emitting continuous wave light;
an optical modulator modulating the continuous wave light;
an auto bias control circuit controlling voltage values of direct current biases of the optical modulator;
a coder coding logical binary data and outputting multi level signals; and
a driver amplifying the multi level signals and driving the optical modulator thereby;
wherein an optical amplitude of the continuous wave light output from the optical modulator is kept constant;
the auto bias control circuit makes the voltage values converge to predetermined values; and
the optical modulator modulates the continuous wave light with multiple amplitudes and phase levels around the converged voltage values.

8. The optical transmitter according to claim 7, further comprising a driver controller measuring an elapsed time from either latest start-up time or reset time of the optical transmitter and turning on the driver after the elapsed time having reached a predetermined time.

9. The optical transmitter according to claim 7, further comprising
a switch unit switching the driver; and
a control unit searching direct current biases of corresponding to a maximal value and to a minimal value of output from the optical modulator, and ordering the auto bias control circuit to apply an average voltage of the direct current biases as a direct current bias controlling an angle of quadrature in the optical modulator.

10. The optical transmitter according to claim 7, further comprising a data controller outputting a fixed data sequence to the coder;
wherein the fixed data sequence is chosen so that
lightwave signals modulated according to the data sequence have a constant amplitude at the center of modulated symbols, and
at least two consecutive symbols of lightwave signals modulated according to the data sequence have a phase difference of 90 degrees.

* * * * *